(12) United States Patent
Lee

(10) Patent No.: US 10,737,537 B2
(45) Date of Patent: Aug. 11, 2020

(54) COUPLING UNIT

(71) Applicant: TANNUS CO., LTD., Gimhae-si (KR)

(72) Inventor: Young Gi Lee, Busan (KR)

(73) Assignee: TANNUS CO., LTD., Gimhae-Si (KR)

( * ) Notice: Subject to any disclaimer, the term of this patent is extended or adjusted under 35 U.S.C. 154(b) by 107 days.

(21) Appl. No.: 16/170,758

(22) Filed: Oct. 25, 2018

(65) Prior Publication Data

US 2019/0061438 A1 Feb. 28, 2019

Related U.S. Application Data

(62) Division of application No. PCT/KR2017/008725, filed on Aug. 11, 2017.

(30) Foreign Application Priority Data

Jan. 25, 2017 (KR) .......................... 10-2017-0011776
Feb. 15, 2017 (KR) .......................... 10-2017-0020702
Feb. 15, 2017 (KR) .......................... 10-2017-0020703

(51) Int. Cl.
*B60C 7/24* (2006.01)
*B60C 15/02* (2006.01)
(Continued)

(52) U.S. Cl.
CPC .............. *B60C 15/022* (2013.01); *B60C 7/22* (2013.01); *B60C 7/24* (2013.01); *B60B 1/003* (2013.01);
(Continued)

(58) Field of Classification Search
CPC .... B60C 7/24; B60C 7/26; B60C 7/28; B60C 15/022; B60C 7/22; B60B 21/025
See application file for complete search history.

(56) References Cited

U.S. PATENT DOCUMENTS 1,336,452 A * 4/1920 Wheelock ................. B60C 7/24
301/23
1,518,746 A * 12/1924 Meyer ....................... B60C 7/24
152/394
(Continued)

FOREIGN PATENT DOCUMENTS

EP 2905146 8/2015
JP 11139103 5/1999
(Continued)

OTHER PUBLICATIONS

International Search Report—PCT/KR2017/008725 dated Nov. 15, 2017.
(Continued)

*Primary Examiner* — Scott A Browne
(74) *Attorney, Agent, or Firm* — Cantor Colburn LLP

(57) ABSTRACT

Provided is a coupling unit for coupling a tire to a rim, the coupling unit including an upper surface, a lower surface, and side surfaces, in which a maximum length of the coupling unit is larger than a distance between both hooks of the rim, the side surfaces include sliding areas that are slidable with respect to the hooks of the rim such that the coupling unit is easily inserted into the rim while the coupling unit is being inserted into the rim, and in a state in which the coupling unit is completely inserted into the rim, at least a part of the upper surface is in surface contact with lower surfaces of the hooks to prevent the coupling unit from being separated from the rim.

13 Claims, 23 Drawing Sheets

(51) Int. Cl.
*B60C 7/22* (2006.01)
*B60B 21/02* (2006.01)
*B60B 1/00* (2006.01)

(52) U.S. Cl.
CPC ......... *B60B 21/021* (2013.01); *B60C 2200/12* (2013.01)

(56) References Cited

U.S. PATENT DOCUMENTS

| | | | | |
|---|---|---|---|---|
| 1,576,206 | A * | 3/1926 | Meyer | B60C 7/24 152/394 |
| 1,638,810 | A * | 8/1927 | Klaus | B60C 7/24 152/394 |
| 1,730,576 | A * | 10/1929 | Klaus | B60C 7/24 152/394 |
| 1,743,688 | A * | 1/1930 | Schoff | B60C 7/24 152/376 |
| 1,817,356 | A * | 8/1931 | Fisher | B60C 7/12 152/327 |
| 5,503,466 | A * | 4/1996 | Lew | A63C 17/223 152/323 |
| 5,507,333 | A * | 4/1996 | Augier | B60C 15/0223 152/379.3 |
| 6,482,140 | B1 * | 11/2002 | Takatsu | B29C 45/14311 492/31 |
| 2006/0231185 | A1 * | 10/2006 | Tanno | B60C 19/002 152/450 |
| 2012/0111468 | A1 | 5/2012 | Lee | |

FOREIGN PATENT DOCUMENTS

| | | |
|---|---|---|
| JP | 4583466 | 11/2010 |
| JP | 2013244947 | 12/2013 |
| KR | 100943331 | 2/2010 |
| KR | 20100007041 | 7/2010 |
| KR | 20110006512 | 1/2011 |
| KR | 20130031117 | 3/2013 |

OTHER PUBLICATIONS

European Search Report—European Application No. 17894140.7 dated Aug. 9, 2019, citing EP 2 905 146 and U.S. Pat. No. 2012/111468.

* cited by examiner

FIG.7

| RIM Standard | | | Variable | | | Equation | | | Comprehensive Determination |
|---|---|---|---|---|---|---|---|---|---|
| R | $L_R$ | $H_R$ | L | h | I | 1 | 2 | 3 | |
| 1 | 13 | 4.5 | 14 | 3 | 3 | X | O | O | X |
| 1 | 13 | 4.5 | 14 | 3 | 3 | X | O | O | X |
| 1 | 13 | 4.5 | 15.5 | 3 | 12 | O | O | X | X |
| 1 | 13 | 4.5 | 15.5 | 3 | 12 | O | X | X | X |
| 1 | 13 | 4.5 | 15.5 | 4 | 12 | O | O | X | X |
| 1 | 13 | 4.5 | 15.5 | 4 | 12 | O | O | X | X |
| 1 | 13 | 4.5 | 17 | 3.25 | 10 | O | X | O | X |
| 1 | 13 | 4.5 | 17 | 3.25 | 10 | X | O | O | X |
| 1 | 13 | 4.5 | 18 | 4.25 | 12 | O | O | X | X |
| 1 | 13 | 4.5 | 18 | 4.25 | 12 | O | O | X | X |
| 1 | 13 | 4.5 | 15.5 | 3.25 | 3 | O | O | O | O |
| 1 | 13 | 4.5 | 15.5 | 3.25 | 3 | O | O | O | O |
| 1 | 13 | 4.5 | 15.5 | 4.25 | 3 | O | O | O | O |
| 1 | 13 | 4.5 | 15.5 | 4.25 | 3 | O | O | O | O |

FIG.8
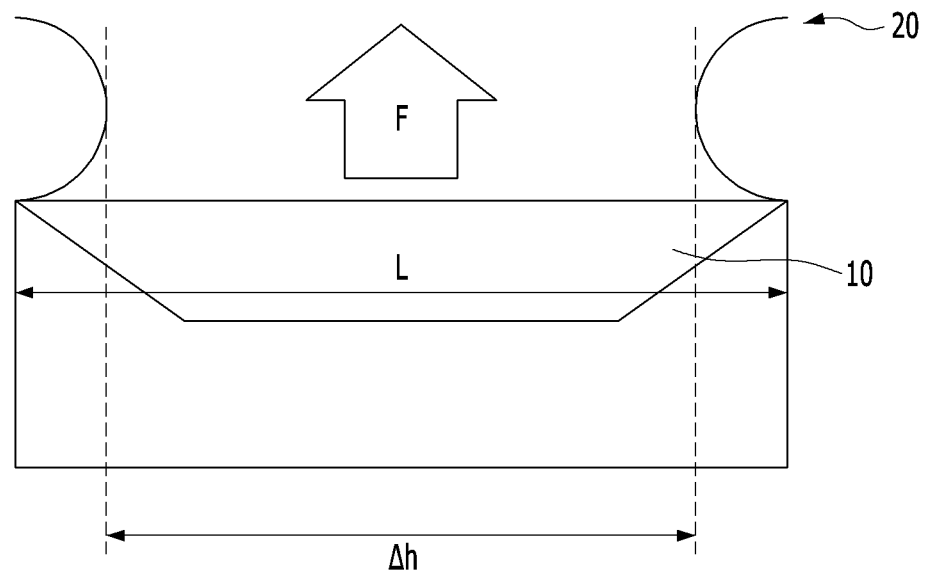
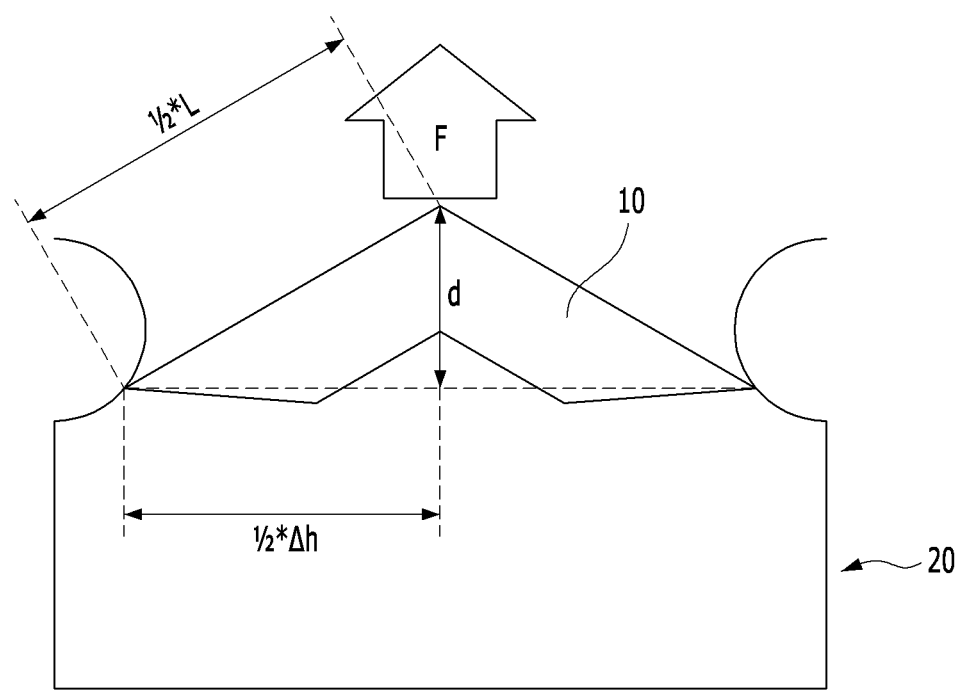

FIG.9

| Working Variable | | | | | Calculated Value | |
|---|---|---|---|---|---|---|
| Δh | L | w | h | F | d | E bend |
| mm | mm | mm | mm | kgf | mm | Mpa |
| 20 | 21.5 | 5 | 2.5 | 20 | 3.944933 | 1580.09 |
| 20 | 21.5 | 5 | 2.5 | 50 | 3.944933 | 3950.224 |
| 20 | 21.5 | 5 | 2.5 | 100 | 3.944933 | 7900.449 |
| 20 | 21.5 | 5 | 3.3 | 20 | 3.944933 | 687.0051 |
| 20 | 21.5 | 5.2 | 2.5 | 60 | 3.944933 | 4557.951 |
| 20 | 21.5 | 5.2 | 2.9 | 80 | 3.944933 | 3893.448 |
| 20 | 22 | 6.6 | 3.9 | 100 | 4.582576 | 1454.075 |
| 20 | 22.5 | 9.8 | 3.5 | 30 | 5.153882 | 386.6074 |
| 20 | 24 | 7.2 | 3.1 | 40 | 6.63325 | 952.173 |
| 20 | 24.5 | 5 | 3.5 | 40 | 7.075486 | 950.1538 |
| 20 | 25.5 | 10 | 3.1 | 30 | 7.909646 | 517.2086 |

FIG.18

| RIM Standard | | | Variable | | | | | Calculated Value | | Equation | | | | | Comprehensive Determination |
|---|---|---|---|---|---|---|---|---|---|---|---|---|---|---|---|
| R | $L_R$ | $H_R$ | L | h | I | a | $\theta_a$ | b | $\theta_b$ | 5 | 6 | 7 | 8 | 9 | |
| 1 | 13 | 4.5 | 14 | 3 | 3 | 1 | 90 | 5.9 | 20 | O | O | X | O | O | X |
| 1 | 13 | 4.5 | 14 | 3 | 3 | 1.3 | 85 | 5.7 | 18 | O | O | O | X | O | X |
| 1 | 13 | 4.5 | 14.5 | 3 | 13 | 3.7 | 75 | 0.6 | 110 | O | O | X | O | X | X |
| 1 | 13 | 4.5 | 14.5 | 3 | 13 | 3.7 | 20 | 3.2 | 148 | O | O | X | O | X | X |
| 1 | 13 | 4.5 | 16.5 | 4 | 11 | 1.3 | 60 | 3.6 | 54 | O | O | O | O | X | X |
| 1 | 13 | 4.5 | 16.5 | 4 | 11 | 1.3 | 15 | 4.0 | 68 | O | O | O | O | X | X |
| 1 | 13 | 4.5 | 17 | 3 | 3 | 3.7 | 30 | 4.0 | 17 | X | X | O | O | O | X |
| 1 | 13 | 4.5 | 17 | 3 | 3 | 3.7 | 5 | 4.3 | 39 | X | O | O | O | O | X |
| 1 | 13 | 4.5 | 17 | 3.75 | 13 | 1.9 | 70 | 2.4 | 56 | X | X | O | O | X | X |
| 1 | 13 | 4.5 | 17 | 3.75 | 13 | 1.9 | 85 | 2.6 | 45 | X | X | O | O | X | X |
| 1 | 13 | 4.5 | 17 | 4.25 | 7 | 3.1 | 90 | 5.1 | 13 | O | X | O | O | O | X |
| 1 | 13 | 4.5 | 17 | 4.25 | 7 | 3.1 | 50 | 3.5 | 32 | X | X | O | O | O | X |
| 1 | 13 | 4.5 | 17.5 | 4.25 | 13 | 2.5 | 60 | 2.3 | 64 | X | X | O | O | X | X |
| 1 | 13 | 4.5 | 15.5 | 3.75 | 9 | 1 | 75 | 4.1 | 43 | O | O | O | O | O | O |
| 1 | 13 | 4.5 | 15.5 | 3.75 | 10 | 1.6 | 75 | 3.2 | 43 | O | O | O | O | O | O |
| 1 | 13 | 4.5 | 15.5 | 3.75 | 11 | 1.6 | 75 | 2.9 | 50 | O | O | O | O | O | O |
| 1 | 13 | 4.5 | 15.5 | 4.25 | 9 | 1.3 | 85 | 4.3 | 43 | O | O | O | O | O | O |

FIG.19
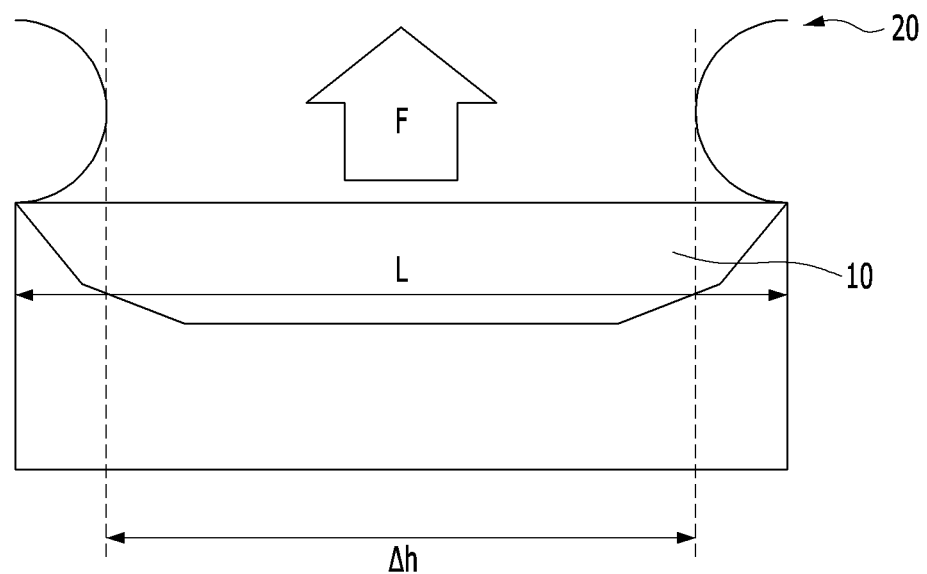
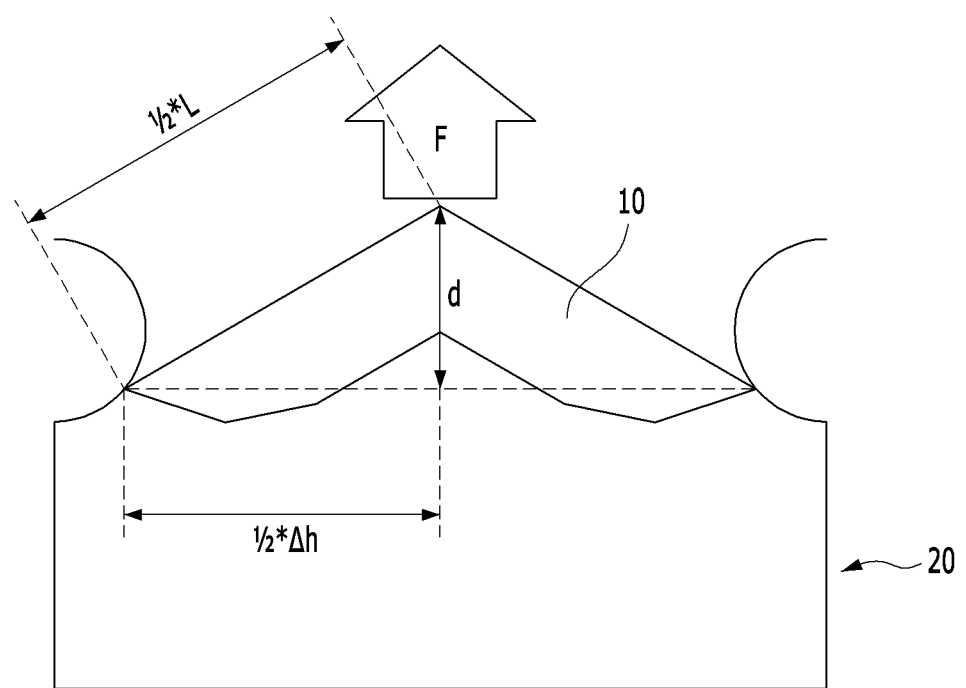

FIG.21
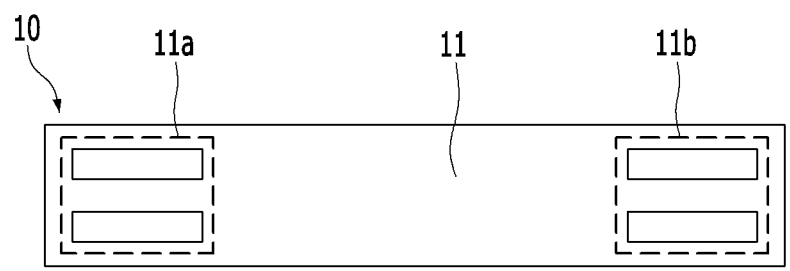
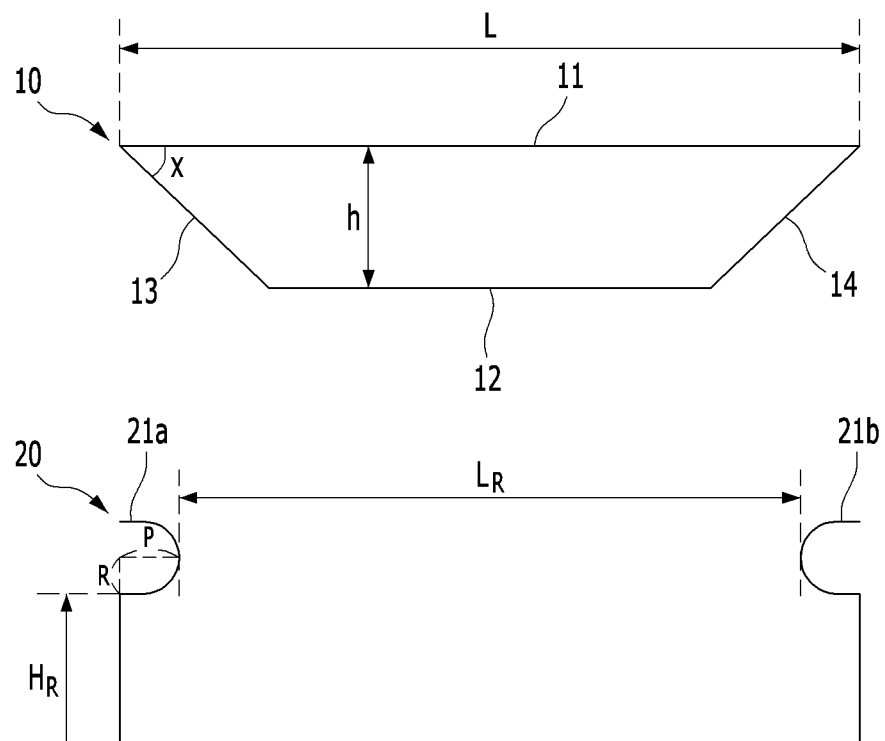

COUPLING UNIT

TECHNICAL FIELD

The present disclosure relates to a Coupling unit for coupling a tire to a rim for a bicycle.

BACKGROUND

In recent years, as awareness of eco-friendly and low-carbon exercise is expanded, an urban bicycle, a mountain bicycle, and the like have widely been supplied. In the case of a generally-used pneumatic tire with a built-in tube, there is a high concern that the pneumatic tire is punctured. Further, as a long time has elapsed, air injected into the tube leaks, and thus air should be injected again.

To solve the above-described problem, a demand for a solid tire instead of the pneumatic tire has increased recently. The solid tire, which is a tire made of only rubber not air, may be used for a longer time as compared to the pneumatic tire and does not have a risk of puncture. Further, such a tire may be attached (or mounted and fixed) to a rim through a fixing pin (in other words, a rim fixing portion, a Coupling unit, or the like).

However, when a vehicle travels while such a tire is mounted on the rim, if an impact applied to the tire is biased in either a left direction or a right direction, as the fixing pin of the tire is separated from the rim, the tire is separated from the rim, and thus a safety accident may occur. Thus, development of a technology that may resolve the above-described problem is required.

A technology corresponding to the background of the present disclosure is disclosed in Korean Patent No. 0943331. Although a structure in which a tire is mounted on a rim through a stopper is disclosed, a condition of a shape or a condition of a physical property which the stopper should have to prevent detachment between the rim and the tire is not absolutely described.

DISCLOSURE OF THE INVENTION

Problems to be Solved by the Invention

The present disclosure has been made to solve the above-described problems of the related art, and the present disclosure provides a Coupling unit configured to prevent a tire from being separated from a rim of a bicycle even when an external impact is applied to the tire mounted on the rim.

The present disclosure has been made to solve the above-described problems of the related art, and the present disclosure also provides a Coupling unit configured to fasten a tire to a rim to prevent a safety accident caused when the tire is separated from the rim.

However, technical problems to be achieved by embodiments of the present disclosure are not limited to the above-described technical problems, and other technical problems may exist.

Means for Solving the Problems

To achieve the above-described technical problems, a Coupling unit according to a first aspect of the present disclosure may include an upper surface, a lower surface, and side surfaces, in which a maximum length of the Coupling unit is larger than a distance between both hooks of the rim, the side surfaces include sliding areas that are slidable with respect to the hooks of the rim such that the Coupling unit is easily inserted into the rim while the Coupling unit is being inserted into the rim, and in a state in which the Coupling unit is completely inserted into the rim, at least a part of the upper surface is in contact with lower surfaces of the hooks to prevent the Coupling unit from being separated from the rim. Further, the Coupling unit may satisfy Equations (1) to (3).

Here, Equation (1) is $$L \geq \sqrt{\left(L_R + P - \frac{1}{2}h\right)^2 + (H_R + R)^2}.$$

In Equation (1), L denotes the maximum length of the Coupling unit, and $L_R$ denotes a distance between the hooks of the rim, P denotes the maximum length by which the hooks protrude from the inner walls of the flange, R denotes ½ of the thickness of the hooks, h denotes the maximum height from the upper surface to the lower surface of the Coupling unit, and $H_R$ denotes the height of the inner wall of the flange.

Further, Equation (2) is $h \leq H_R$. In Equation (2), h denotes the maximum height from the upper surface to the lower surface of the Coupling unit, and $H_R$ denotes the height of the inner wall of the flange of the rim.

Further, Equation (3) is $l \leq \sqrt{(L_R+P-b)^2+(H_R+R)^2}$. In Equation (3), l denotes the minimum length between the side surfaces of the Coupling unit, $L_R$ denotes a length between the two hooks of the rim, P denotes the maximum length by which the hooks protrude from the inner wall of the flange of the rim, and R denotes ½ of the thickness of the hooks, b denotes the larger one of the maximum height from the upper surface to the lower surface of the Coupling unit and 0.5*(the maximum length of the Coupling unit−the minimum length between the side surfaces).

To achieve the above-described technical problems, a Coupling unit according to a second aspect of the present disclosure may include an middle member, a left member extending leftward from the middle member, and a right member extending rightward from the middle member, in which the left member and the right member include first side surfaces and second side surfaces, the second side surfaces include sliding areas that are slidable with respect to hooks of the rim such that the Coupling unit is easily inserted into the rim while the Coupling unit is being inserted into the rim, a maximum length of the Coupling unit is longer than a distance between one side flange inner walls and the other side flange inner walls of the rim such that the Coupling unit is elastically bent and deformed in a state in which at least a part of the first side surface of the left member is in surface contact with a left inner wall of the flange of the rim and at least a part of the first side surface of the right member is in surface contact with a right inner wall of the flange of the rim, and the first side surface of the left member and/or the first side surface of the right member is in surface contact with the flange inner walls of the rim by the elastic bending restoring force acting by the elastic bending and deformation.

To achieve the above-described technical problems, a Coupling unit according to a third aspect of the present disclosure may include an middle member, a left member extending leftward from the middle member, and a right member extending rightward from the middle member, in which one or more left grooves are formed in a left portion with respect to the central portion of an upper surface of the middle member and/or one or more right grooves are formed in a right portion with respect to the central portion of the upper surface of the middle member.

In a bicycle tire according to a fourth aspect of the present disclosure, a rim and a tire may be coupled to each other through the Coupling unit.

The above-described technical solution is merely exemplary, and should not be interpreted as limiting the present disclosure. In addition to the above-described exemplary embodiments, there may be an additional embodiment in the drawings and the detailed description.

Effects of the Invention

According to the above-described technical solution of the present disclosure, a Coupling unit is easily inserted into a rim while the Coupling unit is being inserted into the rim, and at least a part of an upper surface of the Coupling unit comes into contact with lower surfaces of hooks in a state in which the Coupling unit is completely inserted into the rim. Thus, even when an external impact is applied to a tire, the Coupling unit may be prevented from being separated from the rim.

According to the above-described technical solution of the present disclosure, an available space in the rim may be secured when the tire and the rim are coupled to each other.

According to the above-described technical solution of the present disclosure, a safety accident caused by separation of the tire from the rim through the Coupling unit may be prevented.

According to the above-described technical solution of the present disclosure, a Coupling unit is easily inserted into a rim while the Coupling unit is being inserted into the rim, and a first side surface of a left member and/or a first side surface of a right member come into surface contact with inner walls of a flange of a rim by an elastic bending restoring force. Thus, even when an external impact is applied to a tire, the Coupling unit may be prevented from being separated from the rim.

Further, the first side surface of the left member and/or the first side surface of the right member come into surface contact with the inner walls of the flange of the rim by the elastic bending restoring force, so that an adhesive force between the rim and the Coupling unit becomes strong. Accordingly, the amount of noise generated by friction between the rim and the Coupling unit may be reduced.

According to the above-described technical solution of the present disclosure, the Coupling unit is in surface contact with the inner walls of the flange of the rim such that the available space in the rim is secured. Accordingly, a coupling force between the tire and the rim is improved, and when the Coupling unit needs to be replaced, the Coupling unit may be easily separated from the rim.

According to the above-described technical solution of the present disclosure, the amounts by which a left portion and/or a right portion are bent and deformed are larger than the amount by which a central portion is bent and deformed, under the same bending force, by a left groove and/or a right groove formed on an upper surface of the middle member. Accordingly, the Coupling unit is easily inserted into the rim, and a detaching force of the Coupling unit with respect to the rim may be reduced after the Coupling unit is completely inserted into the rim.

According to the above-described technical solution of the present disclosure, a Coupling unit is easily inserted into a rim by sliding areas of the left member and/or the right member while the Coupling unit is being inserted into the rim, and at least a part of an upper surface of the Coupling unit comes into contact with lower surfaces of hooks in a state in which the Coupling unit is completely inserted into the rim. Thus, the Coupling unit may be easily inserted into the rim, and even when an external impact is applied to a tire, the Coupling unit may be prevented from being separated from the rim.

According to the above-described technical solution of the present disclosure, in a state in which the Coupling unit is completely inserted into the rim, at least parts of the sliding areas of the Coupling unit come into surface contact with and are coupled to the inner walls of the flange of the rim, and thus the Coupling unit has a predetermined fixing force against the inner walls of the flange, so that noise generated by friction between the rim and the Coupling unit may be reduced.

However, an effect obtained in the present disclosure is not limited to the above-described effects, and there may be other effects.

BRIEF DESCRIPTION OF THE DRAWINGS

FIG. 7 is a view illustrating a simulation result performed on the Coupling unit according to the embodiment of the present disclosure;

FIG. 8 is a view for explaining a physical property of the Coupling unit according to the embodiment of the present disclosure;

FIG. 9 is a view illustrating a simulation result for a range of a flexural modulus of the Coupling unit according to the embodiment of the present disclosure;

FIG. 18 is a view illustrating a simulation result performed on the Coupling unit according to the embodiment of the present disclosure;

FIG. 19 is a view for explaining a physical property of the Coupling unit according to the embodiment of the present disclosure;

FIG. 21 is a view illustrating a state in which a Coupling unit according to an embodiment of the present disclosure is separated from a rim.

BEST MODE FOR CARRYING OUT THE INVENTION

Figure 1:
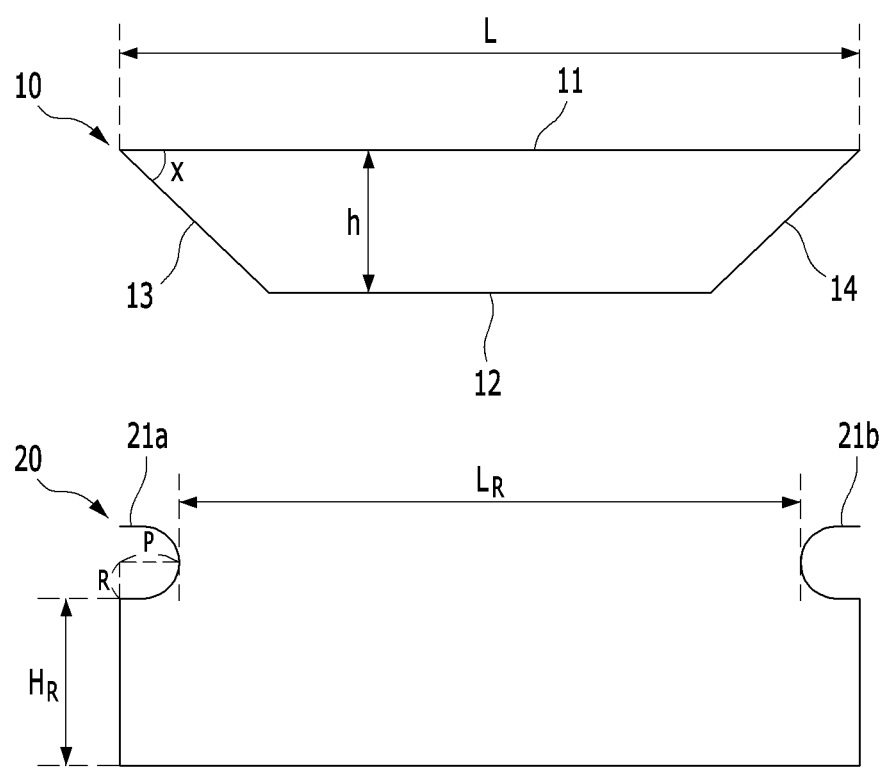
FIG. 1 is a view illustrating a state in which a Coupling unit according to an embodiment of the present disclosure is separated from a rim.

Hereinafter, embodiments of the present disclosure will be described in detail with reference to the accompanying drawings such that those skilled in the art to which the present disclosure pertains may easily implement the present disclosure. However, the present disclosure may be implemented in various different forms, and is not limited to embodiments described herein. Further, to clearly describe the present disclosure, a part unrelated to description is omitted in the drawings. Similar components are designated by similar reference numerals throughout the specification.

Throughout the specification, when it is described that a first component is "connected" to a second component, the first component may be "directly connected" to the second component or the first component may be "electrically connected" or "indirectly connected" to the second component with a third component interposed therebetween.

Throughout the specification, when it is described that a first component is located "on", "above", "at an upper end of", "under", "below", and "at a lower end of" a second component, the first component may be in contact with the second component or a third component may exist between the first and second components.

Throughout the specification, when it is described that a first component includes a second component, the first component does not exclude other components but may further include other components unless mentioned specifically otherwise.

The present disclosure relates to a Coupling unit configured to fasten a tire to a rim, in which the Coupling unit is easily inserted into the rim while the Coupling unit is inserted into the rim for coupling and the Coupling unit is prevented from being separated from the rim by an external impact in a state in which the Coupling unit is completely inserted into the rim.

Hereinafter, a Coupling unit according to a first aspect of the present disclosure will be described in detail.

FIG. 1 is a view illustrating a state in which a Coupling unit according to an embodiment of the present disclosure is separated from a rim.

Referring to FIG. 1, a Coupling unit 10 according to an embodiment of the present disclosure may mean a Coupling unit for coupling a tire to a bicycle rim 20, that is, a unit used to fasten the tire to the rim 20. The Coupling unit 10 may be otherwise called a fixing pin, a rim fixing unit, or the like, and is not limited thereto.

Prior to detailed description, the Coupling unit 10 according to the embodiment of the present disclosure may have opposite surfaces having a predetermined inclination such that the Coupling unit 10 may be easily inserted into the rim 20 when the Coupling unit 10 is inserted into the rim 20. In this case, an angle between a side surface and an upper surface of the Coupling unit 10 according to the embodiment of the present disclosure may satisfies ranges of $0°<x<90°$. This may be more easily understood with reference to FIG. 2A.

Figure 2A:
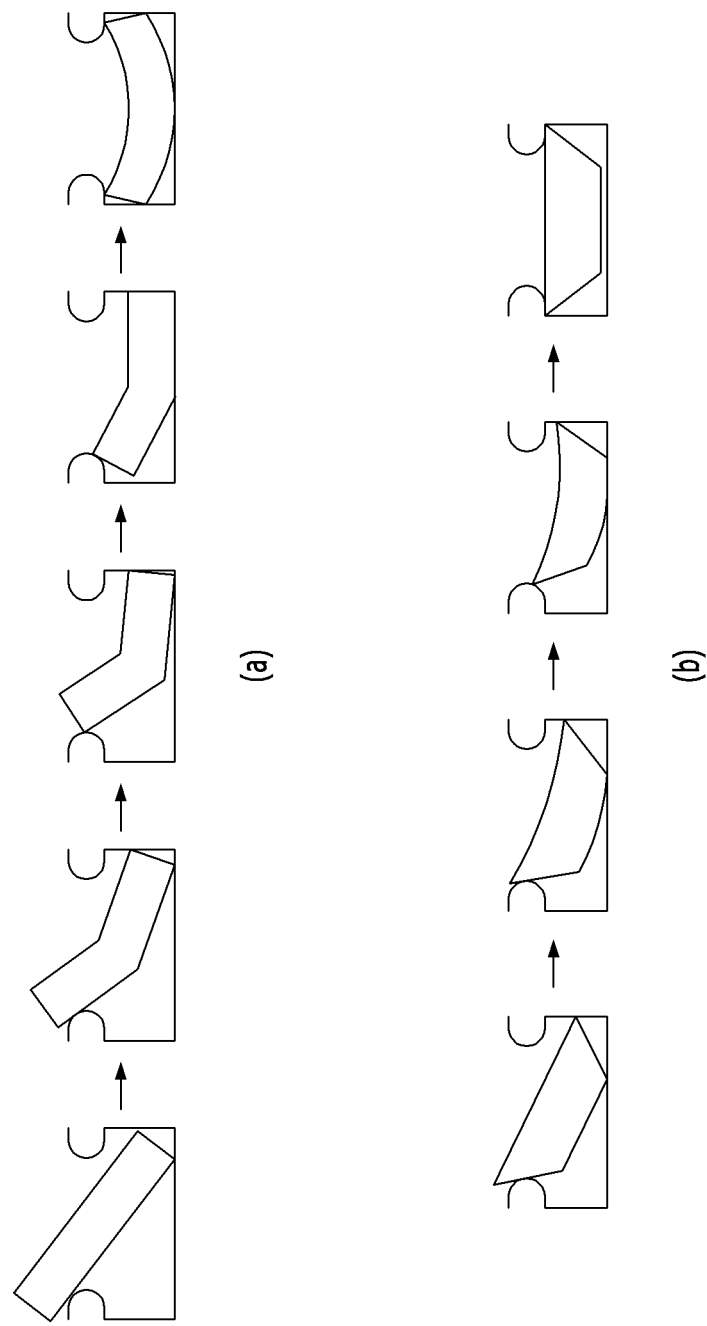
FIG. 2A is a view schematically illustrating a process in which a Coupling unit having no inclination on a lateral surface thereof is inserted into the rim and a process in which a Coupling unit having an inclination on a lateral surface thereof is inserted into the rim.

FIG. 2A is a view schematically illustrating a process in which the Coupling unit is inserted into the rim for the case no inclination on the side surface, that is, in the case of the Coupling unit with an angle x between the side surfaces and the upper surface satisfies 90°, and the case the Coupling unit with the inclination ($0°<x<90°$) in the side surface, respectively. In detail, (a) of FIG. 2A illustrates the process in which the Coupling unit having no inclination on a side surface thereof is inserted into the rim, and (b) of FIG. 2A illustrates the process in which the Coupling unit having an inclination on a side surface thereof, which is like the Coupling unit 10 according to the embodiment of the present disclosure, is inserted into the rim.

Referring to FIG. 2A, it can be identified that when the Coupling unit having no inclination on a side surface thereof, which is like (a), is inserted into a hook of the rim, the Coupling unit is relatively greatly deformed as compared to the Coupling unit having an inclination on a side surface thereof, which is like (b).

In other words, it can be identified that in order to insert the Coupling unit into the rim, the Coupling unit having no inclination on a side surface thereof should be bent much more than the Coupling unit having an inclination on a side surface thereof. This means that when the Coupling unit is inserted into the rim, a larger force should be applied to the Coupling unit having no inclination on a side surface thereof than to the Coupling unit having an inclination on a side surface thereof, or means that the Coupling unit having no inclination on a side surface thereof should have larger flexibility than that of the Coupling unit having an inclination on a side surface thereof. Thus, when the Coupling unit is inserted into the rim, the Coupling unit having no inclination on a side surface thereof requires a relatively larger force than that of the Coupling unit having an inclination on a side surface thereof, and has difficult manufacturing conditions. When the Coupling unit has considerable flexibility, the Coupling unit may be easily inserted into the rim. However, since the Coupling unit may be easily separated after the insertion, safety is degraded.

Thus, since it is difficult for the Coupling unit, of which an angle between a side surface and an upper surface is 90° or more, to be inserted into the rim, an angle between a side surface and an upper surface of the Coupling unit 10 according to the embodiment of the present disclosure ranges of 0°<x<90°, so that the Coupling unit 10 may be easily inserted into the rim without a large force. Further, predetermined flexibility is required, so that it is easy to manufacture the Coupling unit 10. Further, since the Coupling unit 10 according to the embodiment of the present disclosure has predetermined flexibility, the Coupling unit 10 may be easily inserted into the rim and the Coupling unit 10 is not easily separated from the rim in a state in which the Coupling unit is completely inserted into the rim, so that safety may be further improved. Description will be made in more detail.

Referring to FIG. 1, the Coupling unit 10 according to the embodiment of the present disclosure may be inserted into the rim 20, and may include an upper surface 11, a lower surface 12, and side surfaces 13 and 14. Here, the side surfaces 13 and 14 may include a left surface 13 formed on a left side of the Coupling unit 10 with respect to FIG. 1 and a right surface 14 formed on a right side of the Coupling unit with respect to FIG. 1.

In a state in which the Coupling unit 10 is completely inserted into the rim 20, the upper surface 11 is in contact with lower surfaces of hooks 21a and 21b to prevent the Coupling unit 10 from being separated from the rim 20. Accordingly, the upper surface 11 may be one surface including parts in contact with the lower surfaces of the hooks 21a and 21b in a state in which the rim and the tire are coupled to each other. An additional member for increasing a coupling force between the rim and the tire may be formed on the upper surface 11.

A maximum length L of the Coupling unit 10 may be larger than a distance $L_R$ between the two hooks 21a and 21b of the rim 20. Here, the shape of the Coupling unit 10 illustrated in FIG. 1 merely corresponds to one embodiment for helping to understand the present disclosure, and the present disclosure is not limited thereto. For example, the shapes of the two side surfaces 13 and 14 of the Coupling unit 10 may be implemented variously. This may be more easily understood with reference to FIG. 2B.

Figure 2B:
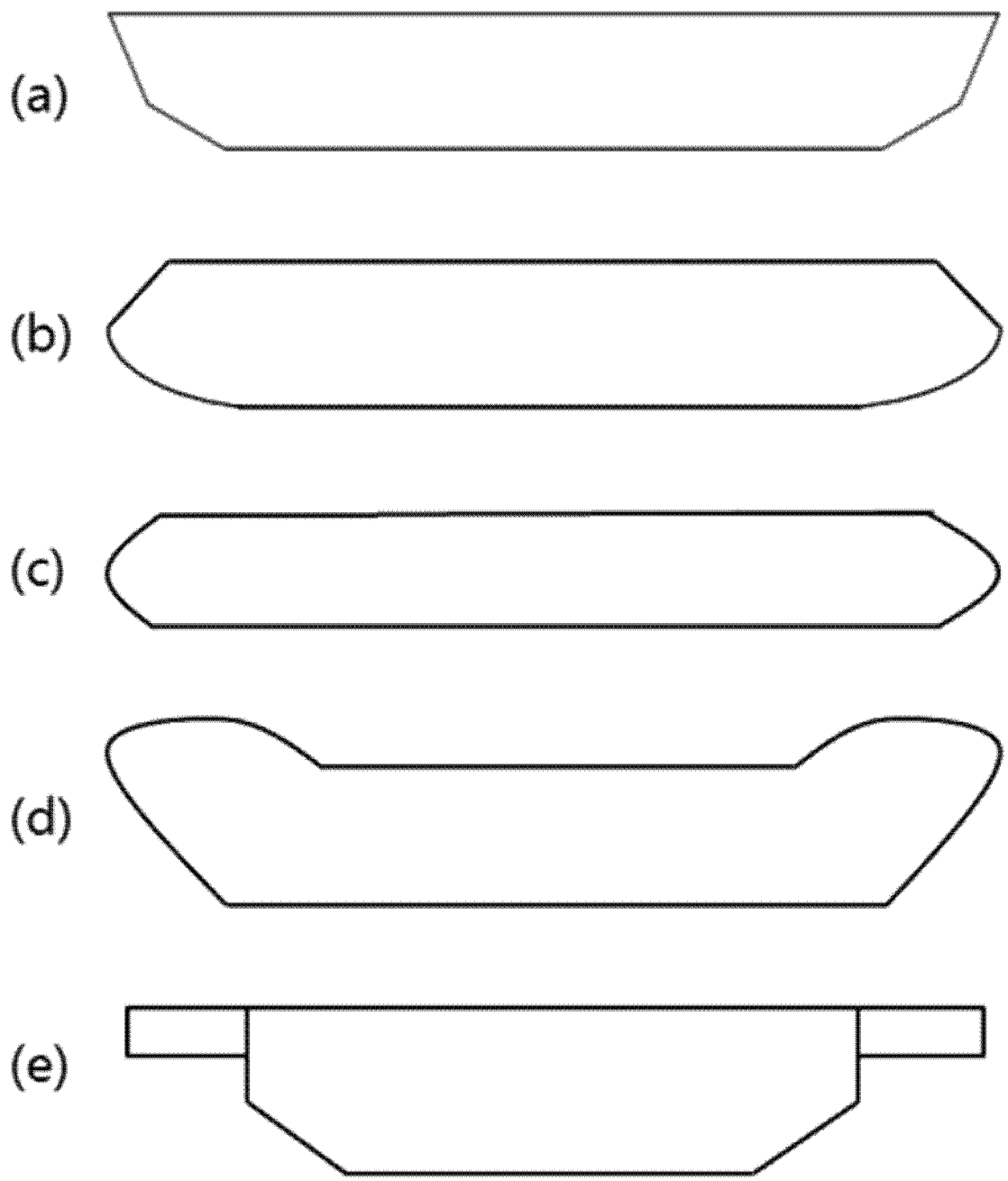
FIG. 2B is a view illustrating an example of the shape of a Coupling unit according to another embodiment of the present disclosure.

FIG. 2B is a view illustrating an example of the shape of a Coupling unit according to another embodiment of the present disclosure.

Referring to FIG. 2B, side surfaces of the Coupling unit according to the another embodiment of the present disclosure may have a shape forming double angles, which is like (a) of FIG. 2B or may have a shape including a line forming a positive angle with respect to an upper surface of the Coupling unit and a curved line, which is like (b) of FIG. 2B. Further, the side surfaces of the Coupling unit according to the another embodiment of the present disclosure may have an outward protruding shape, which is like (c) of FIG. 2B, may have a boss shape protruding from the upper surface of the Coupling unit, which is like (d) of FIG. 2B, or may have a shape in which a separate cutable member is coupled to the side surfaces, which is like (e) of FIG. 2B. The above-described embodiments are merely examples for helping to understand the present disclosure, and the present disclosure is not limited thereto and may be implemented more variously. Accordingly, the above-described maximum length of the Coupling unit or a length between a lower surface and an uppermost portion of an upper surface of the Coupling unit, which will be described below, may be determined depending on the shapes.

Referring back to FIG. 1, the side surfaces 13 and 14 may include sliding areas that are slidable with respect to the hooks 21a and 21b of the rim 20 such that the Coupling unit 10 is easily inserted into the rim 20 while the Coupling unit 10 is being inserted into the rim 20. Further, in a state in which the Coupling unit 10 is completely inserted into the rim 20, at least a part of the upper surface 11 of the Coupling unit 10 is in contact with the lower surfaces of the hooks 21a and 21b, so that the Coupling unit 10 may be prevented from being separated from the rim 20.

In this way, in order to easily insert the Coupling unit 10 into the rim 20 through sliding and prevent the Coupling unit 10 inserted into the rim 20 from being easily separated from the rim 20, the Coupling unit 10 should satisfy the following conditions, which will be described below in more detail.

Figure 3:
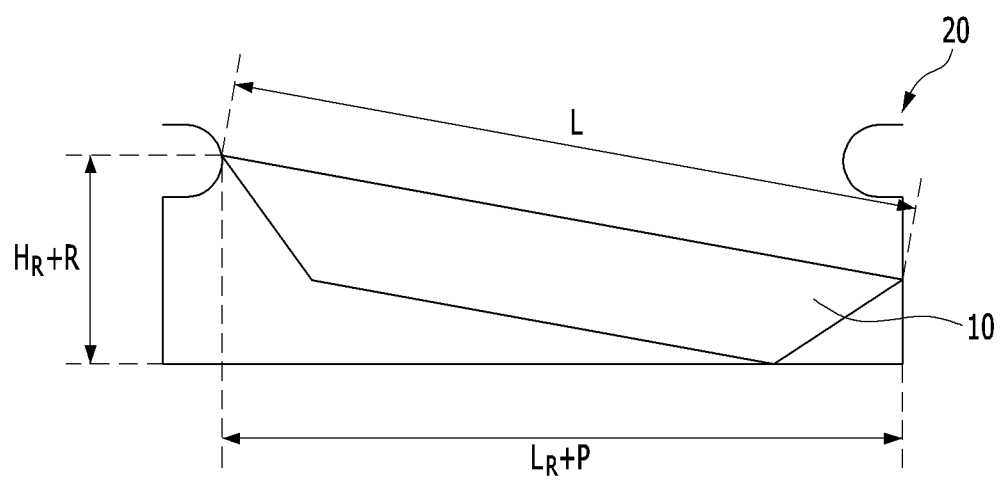
FIG. 3 is a view for explaining a condition for preventing the Coupling unit according to the embodiment of the present disclosure from being separated from the rim after the Coupling unit is inserted into the rim.

FIG. 3 is a view for explaining a condition for preventing the Coupling unit 10 according to the embodiment of the present disclosure from being separated from the rim 20 after the Coupling unit 10 is inserted into the rim 20;

Referring to FIG. 3, in order to prevent the Coupling unit 10 from being separated from the rim 20 by an external impact in a state in which the Coupling unit 10 is completely inserted into the rim 20, the maximum length of the Coupling unit 10 may satisfy Equation (1).

$$L \geq \sqrt{\left(L_R + P - \frac{1}{2}h\right)^2 + (H_R + R)^2} \qquad \text{[Equation 1]}$$

Here, L denotes the maximum length of the Coupling unit 10, and $L_R$ denotes a distance between the two hooks 21a and 21b of the rim 20. Further, P denotes the maximum length by which the left hook 21a or the right hook 21b protrudes from an inner wall of a flange of the rim 20, R denotes ½ of the thickness of the hooks 21a and 21b, h denotes the maximum height from the upper surface 11 to the lower surface 12 of the Coupling unit 10, and $H_R$ denotes the height of the inner wall of the flange of the rim 20.

When the maximum length L of the Coupling unit 10 does not satisfy a condition of Equation (1) (that is, when the maximum length L is smaller than the condition of Equation (1)), the Coupling unit 10 inserted into the rim 20 may be easily separated from the rim 20 by an external force applied to the tire while a bicycle moves. Thus, it is preferable that the maximum length L of the Coupling unit 10 satisfies the condition of Equation (1).

Figure 4:
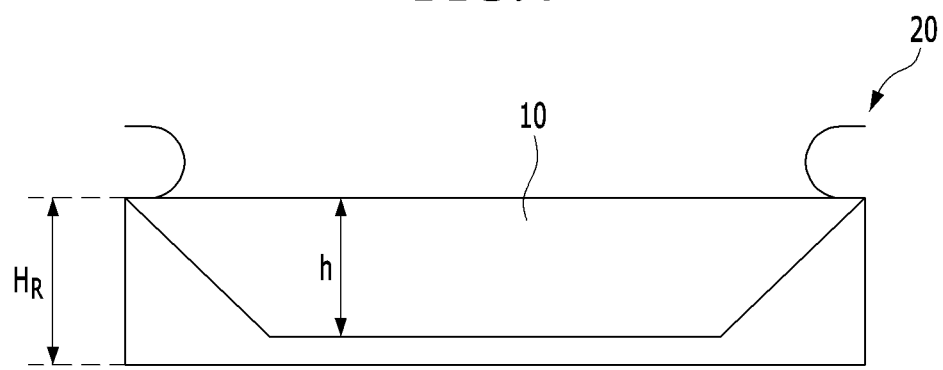
FIG. 4 is a view for explaining a condition for securing an available space in the rim when the Coupling unit according to the embodiment of the present disclosure is inserted into the rim.

Meanwhile, FIG. 4 is a view for explaining a condition for securing an available space in the rim 20 when the Coupling unit 10 is inserted into the rim 20, and FIG. 4 illustrates a state in which the Coupling unit 10 is completely inserted into the rim 20.

Referring to FIG. 4, in a state in which the Coupling unit 10 is completely inserted into the rim 20, at least a part of the upper surface 11 of the Coupling unit 10 is in contact with the lower surfaces of the two hooks 21a and 21b of the rim 20, so that the Coupling unit 10 may be prevented from being separated from the rim 20 by an external impact. Here, when the Coupling unit 10 is inserted into the rim 20, the maximum height of the Coupling unit 10 may satisfy Equation (2) to secure the available space in the rim 20 after coupling between the tire and the rim 20.

$$h \leq H_R \qquad \text{[Equation 2]}$$

Here, h denotes the maximum height from the upper surface 11 to the lower surface 12 of the Coupling unit 10, and $H_R$ denotes the height of the inner wall of the flange of the rim 20.

Accordingly, to secure the available space in the rim 20, the maximum height h from the upper surface 11 to the lower surface 12 of the Coupling unit 10 may be smaller than or equal to the height $H_R$ of the inner wall of the flange.

When there is no available space between a lower surface of the Coupling unit 10 and an inner side of a lower surface of the rim 20 in a state in which the Coupling unit 10 is completely inserted into the rim 20, for example, if the Coupling unit 10 is to be replaced, it is difficult to remove the Coupling unit 10 from the rim 20. Further, when there is no available space in the rim 20 due to the Coupling unit 10 completely inserted into the rim 20, as the tire surrounding an outer side of the lower surface of the Coupling unit 10 may not exist, the tire may not be properly coupled to the rim 20. In this case, even though the Coupling unit 10 is inserted into the rim 20, the tire may be easily separated from the rim 20. Thus, it is preferable that the maximum height h of the Coupling unit 10 satisfies a condition of Equation (2).

Figure 5:
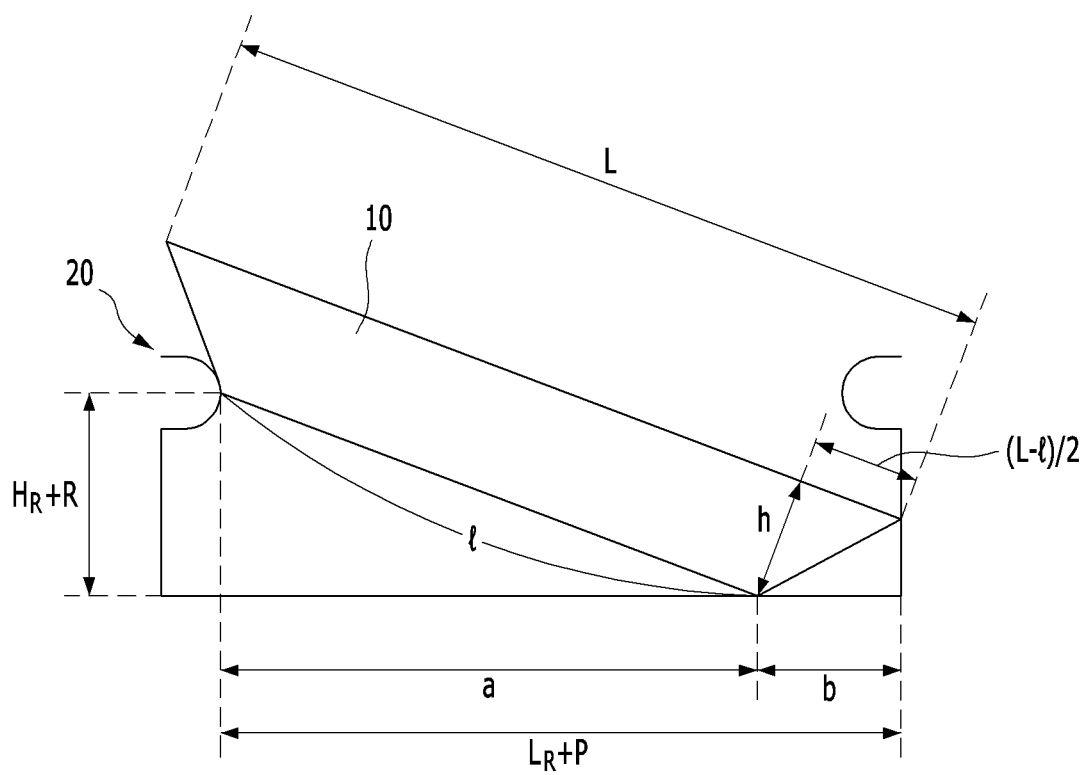
FIG. 5 is a view for explaining a condition for inserting the Coupling unit according to the embodiment of the present disclosure into the rim through sliding.

FIG. 5 is a view for explaining a condition for inserting the Coupling unit 10 according to the embodiment of the present disclosure into the rim 20 through sliding.

Referring to FIG. 5, in order for the Coupling unit 10 according to the embodiment of the present disclosure to be inserted into the rim 20 through sliding, the minimum length between the side surfaces 13 and 14 may satisfy Equation (3).

$$l \leq \sqrt{(L_R+P-b)^2+(H_R+R)^2} \quad \text{[Equation 3]}$$

Here, l denotes the minimum length between the side surfaces 13 and 14 of the Coupling unit 10, $L_R$ denotes a length between the two hooks 21a and 21b of the rim 20, P denotes the maximum length by which the hooks 21a and 21b protrude from the inner wall of the flange of the rim 20, and R denotes ½ of the thickness of the hooks. Further, b denotes the larger one of the maximum height h from the upper surface 11 to the lower surface 12 of the Coupling unit 10, and a half of a value obtained by subtracting the minimum length l between the side surfaces 13 and 14 from the maximum length L of the Coupling unit 10. In order words, b denotes the larger one of a value of "h" and a value of "0.5×(L−l) (in other words, (L−l)/2)".

When the minimum length l between the side surfaces 13 and 14 of the Coupling unit 10 does not satisfy a condition of Equation (3) and is too long, as the Coupling unit 10 is greatly bent as in (a) of FIG. 2A or a large force is required when the Coupling unit 10 is inserted, it is difficult to insert the Coupling unit 10 into the rim 20 or the insertion itself is impossible. Further, when the minimum length l is too long, there is no available space in the rim 20 in a state in which the Coupling unit 10 is completely inserted into the rim 20. Thus, it is preferable that the minimum length l between the side surfaces 13 and 14 of the Coupling unit 10 according to the embodiment of the present disclosure satisfies the condition of Equation (3).

In addition, in order for the Coupling unit 10 according to the embodiment of the present disclosure to be easily inserted into the rim 20, an angle x between the upper surface 11 and the side surfaces 13 and 14 of the Coupling unit 10 may satisfy a range of 0°<x<90°, as described above.

Figure 6:
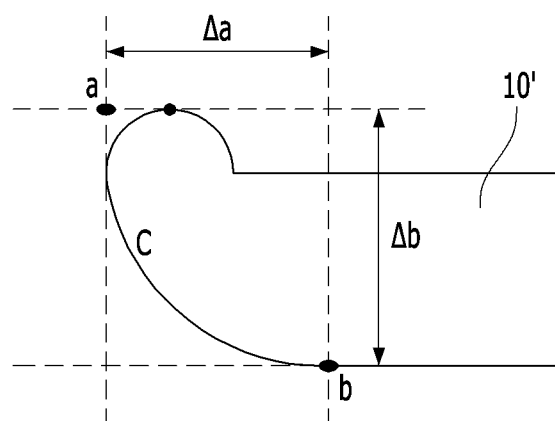
FIG. 6 is a view for explaining a length of a sliding area of the Coupling unit according to the embodiment of the present disclosure.

Meanwhile, FIG. 6 is a view for explaining a length of a sliding area of the Coupling unit according to the embodiment of the present disclosure.

Referring to FIG. 6, as described above, the side surfaces 13 and 14 of the Coupling unit 10 according to the embodiment of the present disclosure may have a straight shape as illustrated in FIG. 1. However, the present disclosure is not limited thereto, and a Coupling unit 10' having a curved shape as illustrated in FIG. 6 may be formed. For example, as illustrated in FIG. 6, in the Coupling unit 10' having a projection on a side surface and an upper surface thereof, a length c of a sliding area of the side surface may mean a length of an elliptic curved line extending from an uppermost portion of the upper surface to a lower surface of the Coupling unit.

Accordingly, in the Coupling unit 10 and 10' according to the embodiment of the present disclosure, the length c of the sliding area may satisfy Equation (4).

$$c < 110\% \times \frac{\pi}{2} \sqrt{\frac{(\Delta a)^2 + (\Delta b)^2}{2}} \quad \text{[Equation 4]}$$

Here, Δa denotes a length transversely extending from a distal end of the lower surface 12 to an intersecting point between a transversely extending virtual line of an uppermost portion of the upper surface 11 and a vertically extending virtual line of one distal end of a longest portion of the Coupling unit 10 and 10', and Δb denotes a length vertically extending from the distal end of the lower surface 12 to the intersecting point between the transversely extending virtual line of the uppermost portion of the upper surface 11 and the vertically extending virtual line of the distal end of the longest portion of the Coupling unit 10 and 10'.

Meanwhile, in a state in which the Coupling unit 10 is completely inserted into the rim 20, at least a part of the sliding area of the Coupling unit 10 may have a predetermined fixing force against the inner wall of the flange, caused by friction between the inner walls of the flange of the rim 20 and Coupling unit 10. Here, in a state in which the Coupling unit 10 is inserted into the rim 20 as illustrated in FIG. 4, in order for the Coupling unit 10 to have a fixing force at a corresponding position inside the rim 20, the Coupling unit 10 may satisfy a condition of '$L > L_R + 2P$'. That is, the maximum length L of the Coupling unit 10 is set to be larger than a value obtained by adding a maximum length (that is, 2P) by which each of the two hooks 21a and 21b protrudes from the inner wall of the flange of the rim 20 to the length $L_R$ between the two hooks 21a and 21b of the rim 20. Thus, the Coupling unit 10 may have a predetermined fixing force inside the rim 20.

In this way, the Coupling unit 10 according to the embodiment of the present disclosure has a shape that satisfies Equation (1) to Equation (3) in addition to Equation (4), so that the Coupling unit 10 may be easily inserted into the rim 20 without a large force. Further, after the Coupling unit 10 is inserted into the rim 20, the Coupling unit 10 may be fixed to the rim 20 so as not to be separated from the rim 20.

FIG. 7 is a view illustrating a simulation result performed on the Coupling unit 10 according to the embodiment of the present disclosure. In detail, FIG. 7 illustrates a simulation result according to whether the Coupling unit 10 satisfies the conditions of Equation (1) to Equation (3) to determine suitability of the Coupling unit 10. In FIG. 7, a numerical value represents a value in millimeters.

Referring to FIG. 7, it can be identified that when the Coupling unit 10 may not satisfy at least one of the conditions of Equation (1) to Equation (3) as the simulation result for the Coupling unit 10 according to the embodiment of the present disclosure (that is, when any one of Equation (1) to Equation (3) is not satisfied), a comprehensive determination result of suitability as a Coupling unit for coupling the tire to the rim 20 is not satisfied, that is, the corresponding Coupling unit 10 is unsuitable as a tire Coupling unit.

On the other hand, it can be identified that when the Coupling unit 10 according to the embodiment of the present disclosure satisfies all the conditions of Equation (1) to Equation (3), the comprehensive determination result on suitability as a Coupling unit for coupling the tire to the rim 20 is satisfied, that is, the corresponding Coupling unit 10 is suitable as a tire Coupling unit.

Here, when the comprehensive determination result is briefly described, the fact that the Coupling unit 10 does not satisfy the condition of Equation (1) (that is, Equation (1) is not satisfied) may mean that the Coupling unit 10 may be easily separated from the rim 20, and the fact that the Coupling unit 10 does not satisfy the condition of Equation (2) (that is, Equation (2) is not satisfied) may mean that there is no available space in the rim 20 when the Coupling unit 10 is completely inserted into the rim 20. Further, the fact that the Coupling unit 10 does not satisfy the condition of Equation (3) (that is, Equation (3) is not satisfied) may mean that the Coupling unit 10 may not be easily inserted into the rim 20 through sliding.

Thus, the fact that the comprehensive determination result is satisfied means that the Coupling unit 10 according to the embodiment of the present disclosure satisfies all the conditions of Equation (1) to Equation (3). This fact means that the Coupling unit 10 according to the embodiment of the present disclosure may be easily inserted into the rim 20, the available space in the rim 20 may be secured in a state in which the Coupling unit 10 is completely inserted into the rim 20, and the Coupling unit 10 may be prevented from being separated from the rim 20. Thus, it can be understood that the Coupling unit 10 is suitable as a tire Coupling unit.

Meanwhile, FIG. 8 is a view for explaining a physical property of the Coupling unit 10 according to the embodiment of the present disclosure.

Referring to FIG. 8, the flexural modulus ($E_{bend}$) of the Coupling unit 10 according to the embodiment of the present disclosure may range from 140 Mpa to 7600 Mpa such that the Coupling unit 10 is prevented from being bent by a load F applied to the Coupling unit 10 after the coupling between the rim 20 and the tire. That is, the Coupling unit 10 according to the embodiment of the present disclosure may satisfy a physical property in which the flexural modulus ($E_{bend}$) ranges from 140 Mpa to 7600 Mpa, so as to be prevented from being bent by the load. This may be more easily understood with reference to FIG. 9.

FIG. 9 is a view illustrating a simulation result for a range of a flexural modulus of the Coupling unit 10 according to the embodiment of the present disclosure.

Referring to FIG. 9, when the flexural modulus of the Coupling unit 10 according to the embodiment of the present disclosure is not more than 140 Mpa as the simulation result for the flexural modulus of the Coupling unit 10, the Coupling unit 10 is very easily bent, and thus is easily separated from the rim 20. Further, when the flexural modulus of the Coupling unit 10 is not less than 7600 Mpa, it is very difficult for the Coupling unit 10 to be bent. Thus, for example, when the Coupling unit 10 needs to be replaced, it is impossible to replace the Coupling unit 10.

Thus, the flexural modulus of the Coupling unit 10 according to the embodiment of the present disclosure may range from 140 Mpa to 7600 Mpa such that the Coupling unit 10 is prevented from being bent very easily or very difficultly.

Here, the flexural modulus of the Coupling unit 10 according to the embodiment of the present disclosure is most preferable under a condition in which a distance Δh between the two hooks of the rim 20 is 20 mm, the maximum length L of the Coupling unit 10 is 21.5 mm, the width w of the Coupling unit 10 is 5 mm, the height h of the Coupling unit 10 is 2.5 mm, and a load F is 20 kgf.

Figure 10:
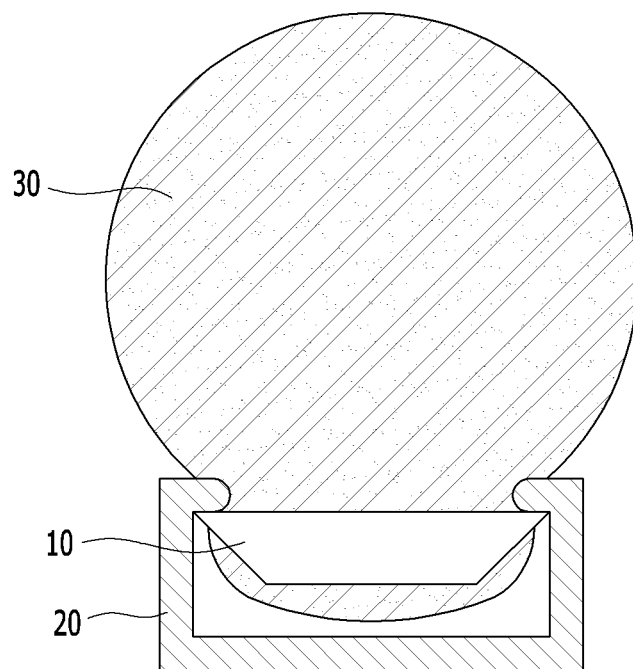
FIG. 10 is a view schematically illustrating a cross-section of a bicycle tire in which a rim and a tire are coupled to each other through the Coupling unit according to the embodiment of the present disclosure.

Meanwhile, FIG. 10 is a view schematically illustrating a cross-section of a bicycle tire in which a rim 20 and a tire 30 are coupled to each other through the Coupling unit 10 according to the embodiment of the present disclosure.

Referring to FIG. 10, the embodiment of the present disclosure may provide a tire for a bicycle, in which the rim 20 and the tire 30 are coupled to each other through the above-described Coupling unit 10 according to the embodiment of the present disclosure.

Here, at least parts of the side surfaces 13 and 14 of the Coupling unit 10 may be coupled to the inner wall of the flange of the rim 20 while coming into contact with the inner wall of the flange of the rim 20. In other words, the at least parts of the side surfaces 13 and 14 may be coupled to the inner wall of the flange while coming into in surface contact with the inner wall of the flange.

Further, the Coupling unit 10 according to the embodiment of the present disclosure may include synthetic resin selected from the group consisting of nylon, polyethylene (PE), polypropylene (PP), acetal, acrylonitrile-butadiene-styrene, poly carbonate (PC), polyacetal, PBT, fluororesin, and a combination thereof, and detailed description of each component will be omitted.

Further, the tire 30 coupled to the rim 20 through the Coupling unit 10 according to the embodiment of the present disclosure may include a solid tire manufactured in an injection foaming method, but is not limited thereto.

The Coupling unit 10 according to the embodiment of the present disclosure is easily inserted into the rim 20 when being inserted into the rim 20 and is prevented from being easily separated from the rim 20 in a state in which the Coupling unit is completely inserted into the rim 20. Further, as the Coupling unit 10 is inserted into the rim 20 such that the available space in the rim 20 is secured, a part of the tire 30 surrounds an outer surface of a lower surface of the Coupling unit 10, so that the corresponding bicycle may travel more stably.

Hereinafter, a Coupling unit according to a second aspect of the present disclosure will be described in detail.

Figure 11:
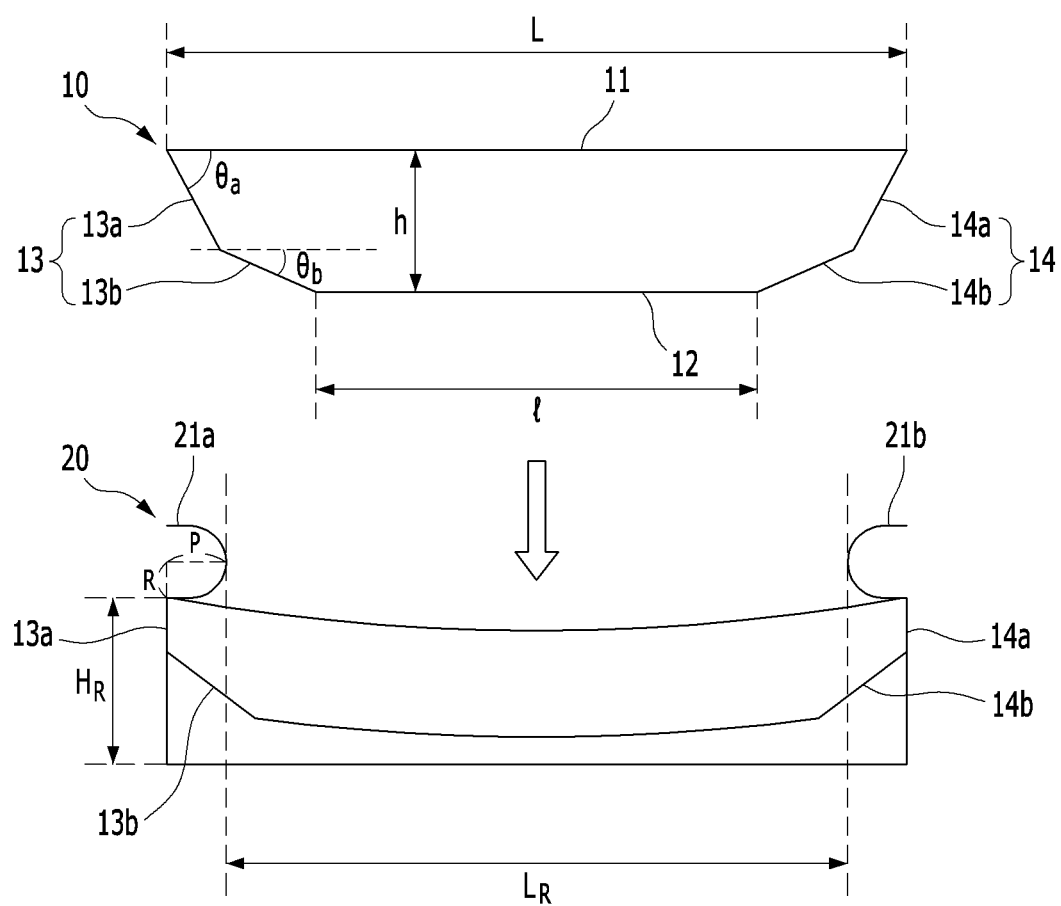
FIG. 11 is a view illustrating a state in which the Coupling unit according to the embodiment of the present disclosure is separated from the rim and a state in which the Coupling unit is coupled to the rim.

FIG. 11 is a view illustrating a state in which a Coupling unit according to an embodiment of the present disclosure is separated from a rim.

Referring to FIG. 11, a Coupling unit 10 according to an embodiment of the present disclosure may mean a Coupling unit for coupling a tire to a bicycle rim 20, that it, a unit used to fasten the tire to the rim 20. The Coupling unit 10 may be otherwise called a fixing pin, a rim fixing unit, or the like, and is not limited thereto.

The Coupling unit 10 according to the embodiment of the present disclosure may have opposite surfaces (that is, a left member 13 and a right member 14 as opposite members, which will be described below) having a predetermined inclination with respect to the upper surface of the Coupling unit 10 such that the Coupling unit 10 may be easily inserted into the rim 20 when the Coupling unit 10 is inserted into the rim 20. In more detail, in the Coupling unit 10 according to the embodiment of the present disclosure, the left member 13 may include a first side surface 13a and a second side surface 13b, and the right member 14 may include a first side surface 14a and a second side surface 14b. In this case, the left member 13 may be called a left surface 13 when otherwise expressed, and the right member 14 may be called a right surface 14 when otherwise expressed. Further, an angle $\theta_a$ between the first side surfaces 13a and 14a and the upper surface 11, that is, an angle $\theta_a$ between the first left surface 13a and the upper surface 11 and/or an angle between the first right surface 14a and the upper surface 11 may range of $0°<\theta_a<90°$. Further, the angle $\theta_a$ between the first side surfaces 13a and 14a and the upper surface 11 and an angle $\theta_b$ between the second side surfaces 13b and 14b and the upper surface 11 may satisfy a relationship of $\theta_a>\theta b$. Meanwhile, an effect obtained as the angle between the first side surfaces 13a and 14a and the upper surface and/or the relationship between $\theta_a$ and $\theta_b$ satisfy the above-described conditions may be more easily understood with reference to FIG. 12.

Figure 12:
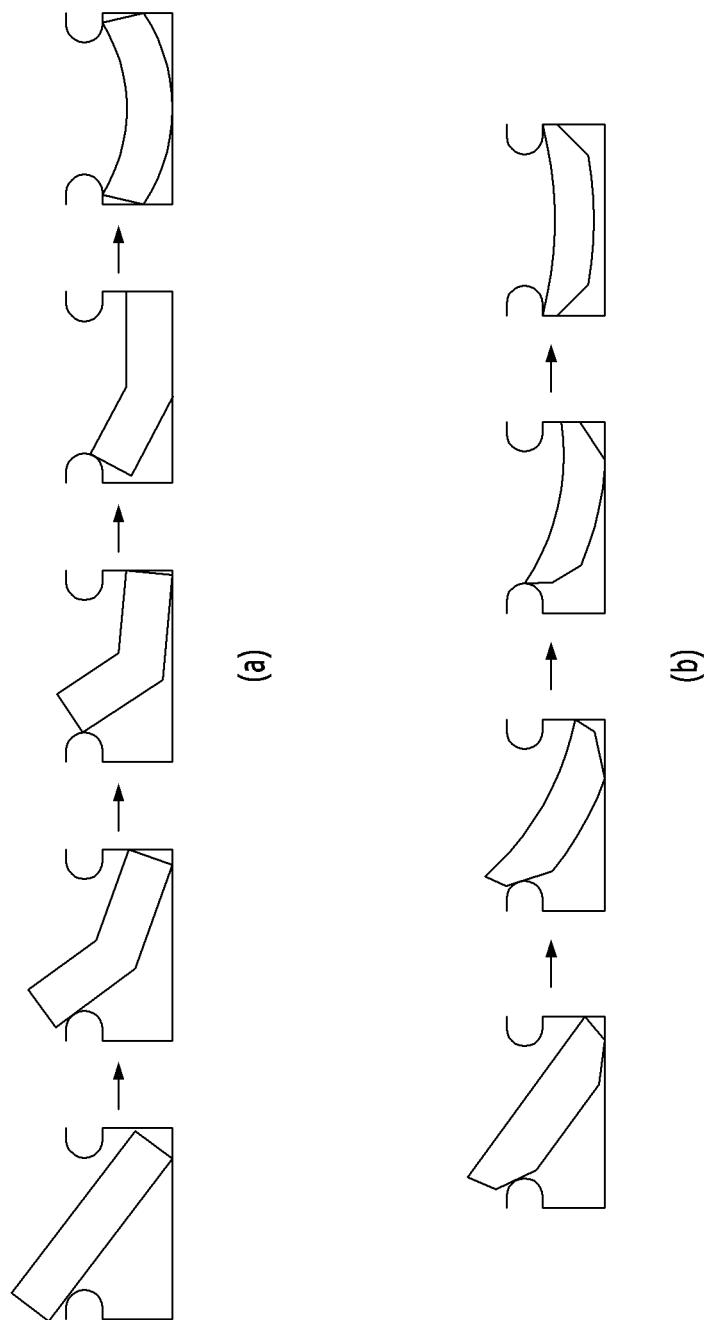
FIG. 12 is a view schematically illustrating (a) a process in which the Coupling unit having no inclination on a lateral surface thereof is inserted into the rim and (b) a process in which the Coupling unit having an inclination on a lateral surface thereof according to the embodiment of the present disclosure is inserted into the rim.

FIG. 12 is a view schematically illustrating a process when the Coupling unit is inserted into the rim, with respect to the Coupling unit corresponding to the Coupling unit having no inclination on a side surface thereof (that is, the Coupling unit of which the angle between the side surface and the upper surface is 90 degrees) and the Coupling unit having an inclination on a side surface thereof (that is, the Coupling unit of which the angle between the first side surfaces 13a and 14a and the upper surface ranges from 0 degree to 90 degrees and in which $\theta_a$ is larger than $\theta_b$, which is like the Coupling unit according to the embodiment of the present disclosure). In detail, (a) of FIG. 12A illustrates the process in which the Coupling unit having no inclination on a side surface thereof is inserted into the rim, and (b) of FIG. 12A illustrates the process in which the Coupling unit having an inclination on a side surface thereof, which is like the Coupling unit 10 according to the embodiment of the present disclosure, is inserted into the rim.

Referring to FIG. 12, it can be identified that when the Coupling unit having no inclination on a side surface thereof, which is like (a) of FIG. 12, is inserted into a hook of the rim, the Coupling unit is relatively greatly deformed as compared to the Coupling unit having an inclination on a side surface thereof, which is like (b) of FIG. 12.

In other words, it can be identified that in order to insert the Coupling unit into the rim, the Coupling unit having no inclination on a side surface thereof should be bent much more than the Coupling unit having an inclination on a side surface thereof. This means that when the Coupling unit is inserted into the rim, a larger force should be applied to the Coupling unit having no inclination on a side surface thereof than to the Coupling unit having an inclination on a side surface thereof, or means that the Coupling unit having no inclination on a side surface thereof should have larger flexibility than that of the Coupling unit having an inclination on a side surface thereof. Thus, when the Coupling unit is inserted into the rim, the Coupling unit having no inclination on a side surface thereof requires a relatively larger force than that of the Coupling unit having an inclination on a side surface thereof, and has difficult manufacturing conditions. When the Coupling unit has considerable flexibility, the Coupling unit may be easily inserted into the rim. However, since the Coupling unit may be easily separated after the insertion, safety is degraded.

Thus, since it is difficult to insert a Coupling unit, of which an angle between a side surface and an upper surface is 90° or more, into a rim, in the Coupling unit 10 according to the embodiment of the present disclosure, the angle $\theta_a$ between the first side surfaces 13a and 14a and the upper surface 11 ranges of $0°<\theta_a<90°$, and the angle $\theta_a$ between the first side surfaces 13a and 14a and the upper surface 11, and the angle $\theta_b$ between the second side surfaces 13b and 14b and the upper surface 11 may satisfy a relationship of $\theta_a>\theta_b$. Thus, the Coupling unit 10 may be easily inserted into the rim 20 without a large force, predetermined flexibility is required, and thus it is easy to manufacture the Coupling unit 10.

Further, since the Coupling unit 10 according to the embodiment of the present disclosure has predetermined flexibility, the Coupling unit 10 may be easily inserted into the rim and the Coupling unit 10 is not easily separated from the rim in a state in which the Coupling unit is completely inserted into the rim, so that safety may be further improved. Description will be made in more detail.

Referring to FIG. 11, the Coupling unit 10 according to the embodiment of the present disclosure may be inserted into the rim 20, and may include an middle member, the left member 13 extending leftward from the middle member, and the right member 14 extending rightward from the middle member. Here, the left member 13 may mean a member formed on a left surface of the Coupling unit 10 with respect to FIG. 11, and may be called the left surface when otherwise expressed. Here, the right member 14 may mean a member formed on a right surface of the Coupling unit 10 with respect to FIG. 11, and may be called the right surface when otherwise expressed. Further, when the Coupling unit 10 may include the upper surface 11 and the lower surface 12, and the middle member may mean at least a part of a member corresponding to the upper surface 11 and the lower surface 12. Further, although the middle member, the left member 13, and the right member 14 may be made of the same material, the present disclosure is not limited thereto.

The left member 13 may include a first side surface 13a and a second side surface 13b, and the right member 14 may include a first side surface 14a and a second side surface 14b. Further, the second side surfaces 13b and 14b may include sliding areas that are slidable with respect to the hooks 21a and 21b of the rim 20 such that the Coupling unit 10 is easily inserted into the rim 20 while the Coupling unit 10 is being inserted into the rim 20. Here, although it is described as an example that the second side surfaces 13b and 14b include the sliding areas, the present disclosure is not limited thereto, and the first side surfaces 13a and 13b may also include sliding areas.

Further, in a state in which the Coupling unit 10 is completely inserted into the rim 20, at least a part of the upper surface 11 of the Coupling unit 10 is in contact with the lower surfaces of the hooks 21a and 21b, so that the Coupling unit 10 may be prevented from being separated from the rim 20. In this case, in order for the Coupling unit 10 to be inserted into the rim 20 through sliding, the minimum length I between the opposite side members 13 and 14 of the Coupling unit 10, that is, the minimum length of the lower surface 12, should satisfy the following condition. Further, in order for the Coupling unit 10 inserted into the rim 20 to be prevented from being separated from the rim 20 due to an external impact, the maximum length L of the Coupling unit 10 should satisfy another condition, which will be described below. Description thereof will be made below in more detail.

In a state in which the Coupling unit 10 is completely inserted into the rim 20, the upper surface 11 is in contact with lower surfaces of hooks 21a and 21b to prevent the Coupling unit 10 from being separated from the rim 20.

Accordingly, the upper surface 11 may be one surface including parts in contact with the lower surfaces of the hooks 21a and 21b in a state in which the rim and the tire are coupled to each other. An additional member for increasing a coupling force between the rim and the tire may be formed on the upper surface 11.

Meanwhile, the shape of the Coupling unit 10 illustrated in FIG. 11 is merely one embodiment for helping to understand the present disclosure, and the present disclosure is not limited thereto. As an example, the shapes of the opposite surfaces, that is, the left member 13 and the right member 14, of the Coupling unit 10 may be variously implemented in the shape of the Coupling unit illustrated in FIG. 1 or the shapes of the Coupling unit illustrated in (b) to (e) of FIG. 2B. Accordingly, the maximum length of the Coupling unit 10 according to the embodiment of the present disclosure or the maximum height from a lower surface to an upper surface of the Coupling unit, which will be described below, may be determined based on the shapes.

The maximum length of the Coupling unit 10 may be longer than a distance between one side flange inner walls and the other side flange inner walls of the rim 20 such that the Coupling unit 10 is elastically bent and deformed in a state in which at least a part of the first side surface 13a of the left member 13 is in surface contact with the left inner wall of the flange of the rim 20 and at least a part of the first side surface 14a of the right member 14 is in surface contact with the right inner wall of the flange of the rim 20. That is, the maximum length L of the Coupling unit 10 may be larger than a distance '$L_R+2P$' between one side flange inner walls and the other side flange inner walls of the rim 20. Here, $L_R$ denotes a distance between the two hooks 21a and 21b, and P denotes a maximum length by which the hooks protrude from the inner walls of the flange.

In this way, as the Coupling unit 10 satisfies a condition of '$L>L_R+2P$', at least a part of each of the first side surfaces 13a and 14a of the opposite side members 13 and 14 of the Coupling unit 10 may be in surface contact with the corresponding inner wall of the flange of the rim 20 in a state in which the Coupling unit 10 is completely inserted into the rim 20.

In other words, as the Coupling unit 10 satisfies a condition of '$L>L_R+2P$', in a state in which the Coupling unit 10 is completely inserted into the rim 20, at least parts of the first side surfaces 13a and 14a of the Coupling unit 10 may have predetermined fixing forces (or binding forces) against the inner walls of the flange, which are caused by friction between the flange inner walls of the rim 20 and Coupling unit 10. That is, the maximum length L of the Coupling unit 10 is set to be larger than a value obtained by adding a maximum length (that is, 2P) by which each of the two hooks 21a and 21b protrudes from the corresponding inner wall of the flange of the rim 20 to the length $L_R$ between the two hooks 21a and 21b of the rim 20, so that the Coupling unit 10 can have a predetermined fixing force in the rim 20.

Further, the first side surface 13a of the left member 13 or the first side surface 14a of the right member 14 may be in surface contact with the corresponding inner wall of the flange of the rim 20 due to an elastic bending restoring force acting by the elastic bending and deformation. In this case, as the at least parts of the first side surfaces 13a and 14a of the Coupling unit 10 come into surface contact with the inner walls of the flange of the rim 20 by the elastic bending restoring force, the Coupling unit 10 may have the predetermined fixing forces (or the binding forces) as described above. Further, as the Coupling unit 10 is prevented from being shaken by the fixing force, noise generated by the Coupling unit 10 when a user rides a bicycle may be effectively reduced. Further, the flexural modulus ($E_{bend}$) of the Coupling unit 10 according to the embodiment of the present disclosure may range from 140 Mpa and 7600 Mpa, and description thereof will be made below in more detail.

Meanwhile, in a state in which the Coupling unit 10 is completely inserted into the rim 20, a predetermined available space is required between the outer side of the lower surface 12 of the Coupling unit 10 and the inner surface of the lower surface of the rim 20. This may be more easily understood with reference to FIG. 13.

Figure 13:
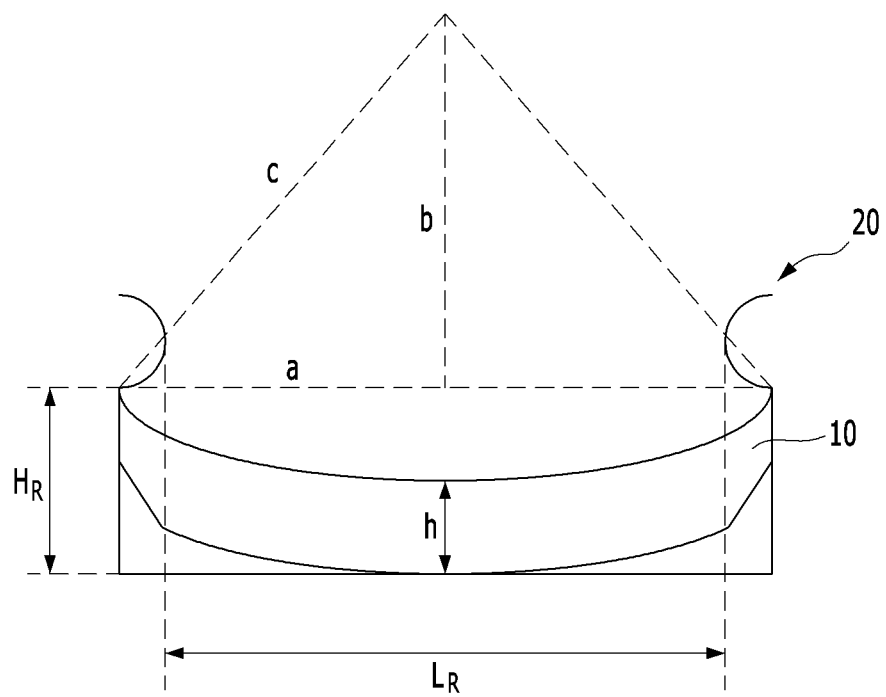
FIG. 13 is a view illustrating a state in which there is no available space in the rim in a state in which the Coupling unit according to the embodiment of the present disclosure is completely inserted into the rim.

FIG. 13 is a view illustrating a state in which there is no available space in the rim in a state in which the Coupling unit 10 according to the embodiment of the present disclosure is completely inserted into the rim.

Referring to FIG. 13, since the maximum length L of the Coupling unit 10 is too long, when there is no available space between the lower surface of the Coupling unit 10 and the inner side of the lower surface of the rim 20 as illustrated in FIG. 13 in a state in which the Coupling unit 10 is completely inserted into the rim 20, for example, if the Coupling unit 10 is to be replaced, it is difficult to remove the Coupling unit 10 from the rim 20. Further, when there is no available space in the rim 20 due to the Coupling unit 10 completely inserted into the rim 20, as the tire surrounding an outer side of the lower surface of the Coupling unit 10 may not exist, the tire may not be properly coupled to the rim 20. In this case, even though the Coupling unit 10 is inserted into the rim 20, the tire may be easily separated from the rim 20. Thus, to secure the available space in the rim 20 when the Coupling unit 10 is inserted into the rim 20, the maximum length L of the Coupling unit 10 may satisfy a condition of Equation (5).

$$L \le 1.1 \times 2 \times 2\pi \times c \times \sin^{-1}\left(\frac{a}{c}\right)/2\pi \qquad \text{[Equation 5]}$$

Here, a process of deriving Equation (5) will be described below.

Referring to FIG. 13, $L_R$ denotes a distance between the two hooks 21a and 21b of the rim 20, and P denotes a maximum length by which the left hook 21a or the right hook 21b protrudes from the corresponding inner wall of the flange of the rim 20. Further, h denotes the maximum height from the upper surface 11 to the lower surface 12 of the Coupling unit 10, and $H_R$ denotes the height of the inner wall of the flange of the rim 20. Here, in FIG. 13, the lengths of three sides expressed in dotted lines are a, b, and c.

$$a = \frac{1}{2}(L_R + 2P),\ b = c(H_R - h),\ \text{and}$$

$$c = \frac{(L_R + 2P)^2}{8(B_R - h)} + \frac{(H_R - h)}{2}.$$

Thus, the maximum length L of the Coupling unit 10 may be derived based on the calculated value of c. Meanwhile, in Equation (5), $$\sin^{-1}\left(\frac{a}{c}\right)$$

denotes an angle between c and b in FIG. 13.

Further, even when the thickness of the Coupling unit 10 is too large, when the Coupling unit 10 is inserted into the rim 20, there is no available space in the rim 20. Thus, the maximum height h (that is, the maximum thickness) of the Coupling unit 10 according to the embodiment of the present disclosure may satisfy the following condition. This may be more easily understood with reference to FIG. 14.

Figure 14:
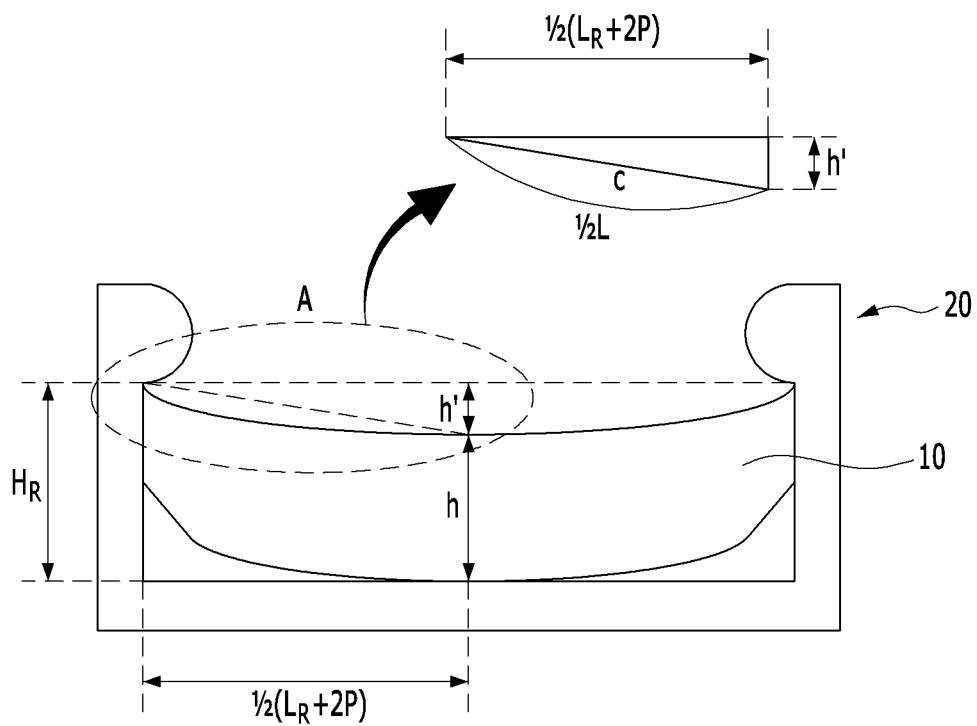
FIG. 14 is a view illustrating a state in which there is no available space in the rim due to the thick Coupling unit in a state in which the Coupling unit according to the embodiment of the present disclosure is completely inserted into the rim.

FIG. 14 is a view illustrating a state in which there is no available space in the rim due to the thick Coupling unit in a state in which the Coupling unit according to the embodiment of the present disclosure is completely inserted into the rim.

Referring to FIG. 14, even when the maximum height (or the maximum thickness) of the Coupling unit 10 is too large as well as the above-described maximum length of the Coupling unit 10 is too long, if the Coupling unit 10 is inserted into the rim 20, there is no available space in the rim 20. Thus, to secure the available space in the rim 20 when the Coupling unit 10 is inserted into the rim 20, the maximum height from the upper surface 11 to the lower surface 12 of the Coupling unit 10 may satisfy a condition of Equation (6).

$$h = H_R - \sqrt{\left(0.9 \times \frac{1}{2}L\right)^2 - \left(\frac{1}{2}(L_R + 2P)\right)^2} \qquad \text{[Equation 6]}$$

Here, L denotes the maximum length of the Coupling unit 10, $L_R$ denotes a distance between the two hooks 21a and 21b of the rim 20, P denotes the maximum length by which the hooks protrude from the inner walls of the flange, h denotes the maximum height from the upper surface 11 to the lower surface 12 of the Coupling unit 10, and $H_R$ denotes the height of the inner wall of the flange of the rim 20.

In more detail, referring to FIG. 14, the height h from the upper surface 11 to the lower surface 12 of the Coupling unit 10 may be smaller than or equal to a value obtained by subtracting a length corresponding to h' from the height $H_R$ of the inner wall of the flange of the rim 20. Here, referring to an enlarged portion A of FIG. 14, when it is assumed that the length of c is slightly smaller than a half ½×L of the length of the upper surface 11 of the Coupling unit 10 (that is, the length of the upper surface 11 forming a curved line in a state in which the Coupling unit is completely inserted into the rim) (for example, when it is assumed that the length of c is smaller than ½×L by about 10%), the length of h' may be expressed as $$\sqrt{\left(0.9 \times \frac{1}{2}L\right)^2 - \left(\frac{1}{2}(L_R + 2P)\right)^2}.$$

Based on this, as the maximum height h of the Coupling unit 10 according to the embodiment of the present disclosure satisfies the condition of Equation (6), the available space in the rim 20 may be secured when the Coupling unit 10 is completely inserted into the rim 20. Through this, it is easy to replace the Coupling unit 10, and a fixing force of the tire against the rim 20 may be increased.

Further, the following conditions may be satisfied such that the Coupling unit 10 according to the embodiment of the present disclosure is easily inserted into the rim 20 through sliding and is prevented from being separated from the rim 20 after being completely inserted into the rim 20. Description will be made in more detail.

Figure 15:
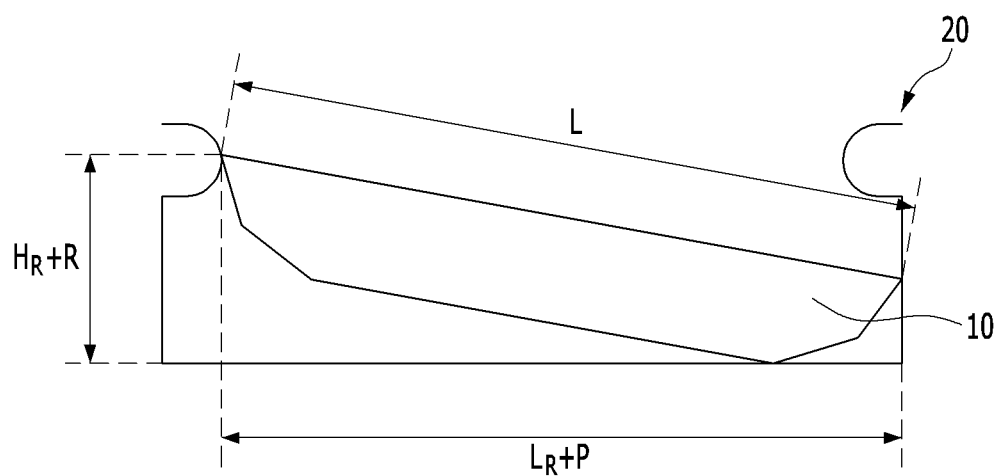
FIG. 15 is a view for explaining a condition for preventing the Coupling unit according to the embodiment of the present disclosure from being separated from the rim after the Coupling unit is inserted into the rim.

FIG. 15 is a view for explaining a condition for preventing the Coupling unit according to the embodiment of the present disclosure from being separated from the rim after the Coupling unit is inserted into the rim.

Referring to FIG. 15, in order to prevent the Coupling unit 10 from being separated from the rim 20 by an external impact in a state in which the Coupling unit 10 is completely inserted into the rim 20, the maximum length of the Coupling unit 10 may satisfy Equation (7).

$$L \geq \sqrt{\left(L_R + P - \frac{1}{2}h\right)^2 + (H_R + R)^2} \qquad \text{[Equation 7]}$$

Here, L denotes the maximum length of the Coupling unit 10, and $L_R$ denotes a distance between the two hooks 21a and 21b of the rim 20. Further, P denotes the maximum length by which the hooks protrude from the inner walls of the flange, R denotes ½ of the thickness of the hooks, h denotes the maximum height from the upper surface 11 to the lower surface 12 of the Coupling unit 10, and $H_R$ denotes the height of the inner wall of the flange of the rim 20.

When the maximum length L of the Coupling unit 10 does not satisfy a condition of Equation (7) (that is, when the maximum length L is smaller than the condition of Equation (7)), the Coupling unit 10 inserted into the rim 20 may be easily separated from the rim 20 by an external force applied to the tire while a bicycle moves. Thus, it is preferable that in order to prevent the Coupling unit 10 from being easily separated from the rim 20, the maximum length L of the Coupling unit 10 satisfies the condition of Equation (7).

Figure 16:
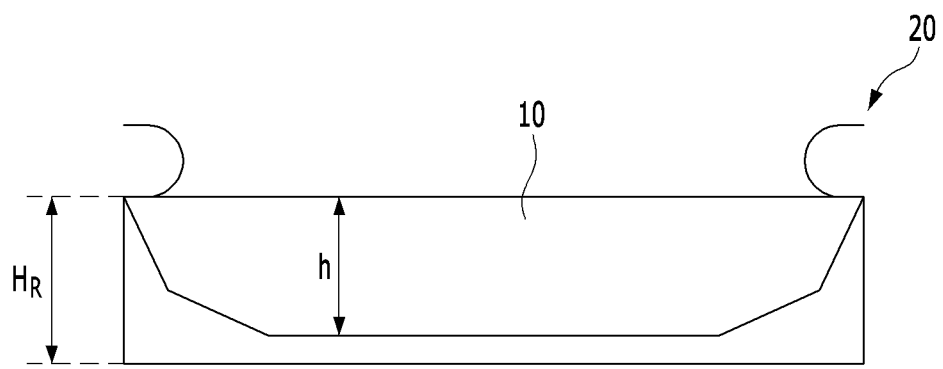
FIG. 16 is a view for explaining a condition for securing an available space in the rim when the Coupling unit according to the embodiment of the present disclosure is inserted into the rim.

FIG. 16 is a view for explaining a condition for securing an available space in the rim 20 when the Coupling unit 10 is inserted into the rim 20, and FIG. 16 illustrates a state in which the Coupling unit 10 is completely inserted into the rim 20.

Referring to FIG. 16, in a state in which the Coupling unit 10 is completely inserted into the rim 20, at least a part of the upper surface 11 of the Coupling unit 10 is in contact with the lower surfaces of the two hooks 21a and 21b of the rim 20, so that the Coupling unit 10 may be prevented from being separated from the rim 20 by an external impact. Here, when the Coupling unit 10 is inserted into the rim 20, the maximum height of the Coupling unit 10 may satisfy Equation (8) to secure the available space in the rim 20 after coupling between the tire and the rim 20.

$$h \leq H_R \qquad \text{[Equation 8]}$$

Here, h denotes the maximum height from the upper surface 11 to the lower surface 12 of the Coupling unit 10, and $H_R$ denotes the height of the inner wall of the flange of the rim 20.

Accordingly, to secure the available space in the rim 20, the maximum height h from the upper surface 11 to the lower surface 12 of the Coupling unit 10 may be smaller than or equal to the height $H_R$ of the inner wall of the flange. In this case, it can be understood that a case where the maximum height of the Coupling unit 10 satisfies a condition of Equation (8) corresponds to a case where the Coupling unit 10 is not bent in a state in which the Coupling unit 10 is completely inserted into the rim 20. However, it is preferable that the at least parts of the first side surfaces 13a and 14a are in surface contact with the inner walls of the flange of the rim 20 in a state in which the Coupling unit 10 according to the embodiment of the present disclosure is completely inserted into the rim 20. Thus, in this case, it is preferable that considering that the Coupling unit 10 may be bent by a predetermined level, the maximum height of the Coupling unit 10 satisfies the condition of Equation (6).

Figure 17:
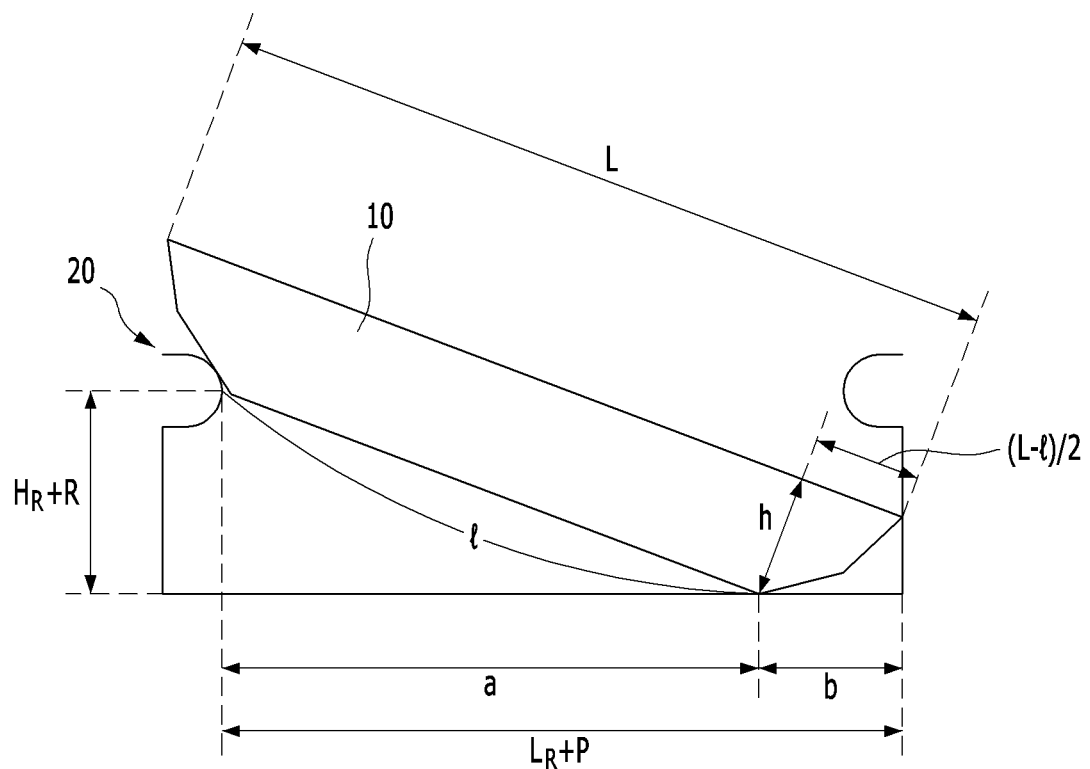
FIG. 17 is a view for explaining a condition for inserting the Coupling unit according to the embodiment of the present disclosure into the rim through sliding.

FIG. 17 is a view for explaining a condition for inserting the Coupling unit 10 according to the embodiment of the present disclosure into the rim 20 through sliding.

Referring to FIG. 17, in order for the Coupling unit 10 according to the embodiment of the present disclosure to be inserted into the rim 20 through sliding, the minimum length between the opposite side members 13 and 14, that is, the minimum length between the second left surface 13b and the second right surface 14b may satisfy Equation (9).

$$l \leq \sqrt{(L_R+P-b)^2+(H_R+R)^2}$$ [Equation 9]

Here, l denotes the minimum length between the left member 13 and the right member 14 of the Coupling unit 10, that is, the minimum length between the second side surfaces 13b and 14b, $L_R$ denotes a length between the two hooks 21a and 21b, P denotes the maximum length by which the hooks protrude from the inner walls of the flange, and R denotes ½ of the thickness of the hooks. Further, b denotes the larger one of the maximum height h from the upper surface 11 to the lower surface 12 of the Coupling unit 10 and a half of a value obtained by subtracting the minimum length l between the left member 13 and the right member 14 from the maximum length L of the Coupling unit 10. In order words, b denotes the larger one of a value of "h" and a value of "0.5×(L−l) (in other words, (L−l)/2)".

When the minimum length l between the second side surfaces 13b and 14b of the Coupling unit 10 does not satisfy a condition of Equation (9) and is too long, as the Coupling unit 10 is greatly bent as in (a) of FIG. 12 or a large force is required when the Coupling unit 10 is inserted, it is difficult to insert the Coupling unit 10 into the rim 20 or the insertion itself is impossible. Further, when the minimum length l is too long, there is no available space in the rim 20 in a state in which the Coupling unit 10 is completely inserted into the rim 20. Thus, it is preferable that the minimum length l between the second side surfaces 13b and 14b of the Coupling unit 10 according to the embodiment of the present disclosure satisfies the condition of Equation (9).

Meanwhile, in the Coupling unit 10 according to the embodiment of the present disclosure, the opposite side members 13 and 14 form double angles as in the embodiment of FIG. 11. However, the present disclosure is not limited to. Further, in the Coupling unit 10' according to another embodiment of the present disclosure, the opposite side members may have a curved as in FIG. 6. For example, as illustrated in FIG. 6, when the Coupling unit 10' has projections on the opposite side members and the upper surface (top surface) thereof, a length c of a sliding area may mean a length of an elliptic curved line extending from an uppermost portion of the upper surface to a lower surface of the Coupling unit.

Accordingly, in the Coupling unit 10 and 10' according to the embodiment of the present disclosure, the length c of the sliding area may satisfy Equation (4). Since description of Equation (4) has been described above in detail, duplicate description will be omitted.

The Coupling unit 10 according to the embodiment of the present disclosure has a shape that satisfies Equations (4) to (9), so that the Coupling unit 10 may be easily inserted into the rim 20 without a large force. Further, after the Coupling unit 10 is inserted into the rim 20, the Coupling unit 10 may be fixed to the rim 20 so as not to be separated from the rim 20.

FIG. 18 is a view illustrating a simulation result performed on the Coupling unit 10 according to the embodiment of the present disclosure. In detail, FIG. 18 illustrates a simulation result according to whether the Coupling unit 10 satisfies the conditions of Equation (5) to Equation (9) to determine suitability of the Coupling unit 10. In FIG. 18, $\theta_a$ and $\theta_b$ are expressed in degrees (°), and the other variables are expressed in millimeters (mm).

Referring to FIG. 18, it can be identified that when the Coupling unit 10 may not satisfy at least one of the conditions of Equation (5) to Equation (9) as the simulation result for the Coupling unit 10 according to the embodiment of the present disclosure (that is, when any one of Equation (5) to Equation (9) is not satisfied), a comprehensive determination result on suitability as a Coupling unit for coupling the tire to the rim 20 is not satisfied, that is, the corresponding Coupling unit 10 is unsuitable as a tire Coupling unit.

On the other hand, it can be identified that when the Coupling unit 10 according to the embodiment of the present disclosure satisfies all the conditions of Equation (5) to Equation (9), the comprehensive determination result on suitability as a Coupling unit for coupling the tire to the rim 20 is satisfied, that is, the corresponding Coupling unit is suitable as a tire Coupling unit.

Here, when the comprehensive determination result is briefly described, the fact that the Coupling unit does not satisfy the condition of Equation (5) (that is, Equation (5) is not satisfied) may mean that the Coupling unit 10 is too long, and thus there is no available space in the rim 20 when the Coupling unit 10 is completely inserted into the rim 20, and the fact that the Coupling unit 10 does not satisfy the condition of Equation (6) or Equation (8) (that is, Equation (6) or Equation (8) is not satisfied) may mean that the maximum height of the Coupling unit 10 is too long (that is, too thick), and thus there is no available space in the rim 20 when the Coupling unit 10 is completely inserted into the rim 20. Further, the fact that the Coupling unit 10 does not satisfy the condition of Equation (7) (that is, Equation (7) is not satisfied) may mean that the Coupling unit 10 is too short, and thus the Coupling unit 10 may be easily separated from the rim 20, and that fact that the Coupling unit 10 does not satisfy the condition of Equation (9) (that is, Equation (9) is not satisfied) may mean that the minimum length between the left member and the right member of the Coupling unit 10 is too long, and thus it is impossible to easily insert the Coupling unit 10 into the rim 20 through sliding.

Thus, the fact that the comprehensive determination result is satisfied means that the Coupling unit 10 according to the embodiment of the present disclosure satisfies all the conditions of Equation (5) to Equation (9). This fact means that the Coupling unit 10 according to the embodiment of the present disclosure may be easily inserted into the rim 20, the available space in the rim 20 may be secured in a state in which the Coupling unit 10 is completely inserted into the rim 20, and the Coupling unit 10 may be prevented from being separated from the rim 20. Thus, it can be understood that the Coupling unit 10 is suitable as a tire Coupling unit.

In addition, in order for the Coupling unit 10 according to the embodiment of the present disclosure to be easily inserted into the rim 20, an angle $\theta_a$ between the upper surface 11 and the first side surfaces 13a and 14a of the Coupling unit 10 may satisfy a range of 0 degree to 90 degrees, as described above. Further, the angle $\theta_a$ between the first side surfaces 13a and 14a and the upper surface 11 and the angle $\theta_b$ between the second side surfaces 13b and 14b and the upper surface 11 may satisfy a relationship of $\theta_a > \theta_b$.

Meanwhile, FIG. 19 is a view for explaining a physical property of the Coupling unit 10 according to a second aspect of the present disclosure.

Referring to FIG. 19, when the Coupling unit 10 is too flexible, opposite distal ends of the upper surface 11 of the Coupling unit 10 may not be supported on the lower surfaces of the two hooks 21a and 21b of the rim, and thus, the Coupling unit 10 may be easily separated from the rim 20 due to an external impact while the bicycle travels. Thus, predetermined flexibility of the Coupling unit 10 is required. Accordingly, the flexural modulus ($E_{bend}$) of the Coupling unit 10 according to the embodiment of the present disclosure may range from 140 Mpa to 7600 Mpa such that the Coupling unit 10 is prevented from being bent by a load F applied to the Coupling unit 10 after the coupling between the rim 20 and the tire. That is, the Coupling unit 10 according to the embodiment of the present disclosure may satisfy a physical property in which the flexural modulus ($E_{bend}$) ranges from 140 Mpa to 7600 Mpa, so as to be prevented from being bent by the load. It may be understood that this is the same as or similar to the above description of FIG. 9.

Referring to FIG. 9, when the flexural modulus of the Coupling unit 10 according to the second aspect of the present disclosure is not more than 140 Mpa as the simulation result for the flexural modulus of the Coupling unit 10, the Coupling unit 10 is very easily bent, and thus is easily separated from the rim 20. Further, when the flexural modulus of the Coupling unit 10 is not less than 7600 Mpa, it is very difficult for the Coupling unit 10 to be bent. Thus, for example, when the Coupling unit 10 needs to be replaced, it is impossible to replace the Coupling unit 10.

Thus, the flexural modulus of the Coupling unit 10 according to the embodiment of the present disclosure may range from 140 Mpa to 7600 Mpa such that the Coupling unit 10 is prevented from being bent very easily or very difficultly.

Here, the flexural modulus of the Coupling unit 10 according to the embodiment of the present disclosure is most preferable under a condition in which a distance Δh between the two hooks of the rim 20 is 20 mm, the maximum length L of the Coupling unit 10 is 21.5 mm, the width w of the Coupling unit 10 is 5 mm, the height h of the Coupling unit 10 is 2.5 mm, and a load F is 20 kgf.

Figure 20:
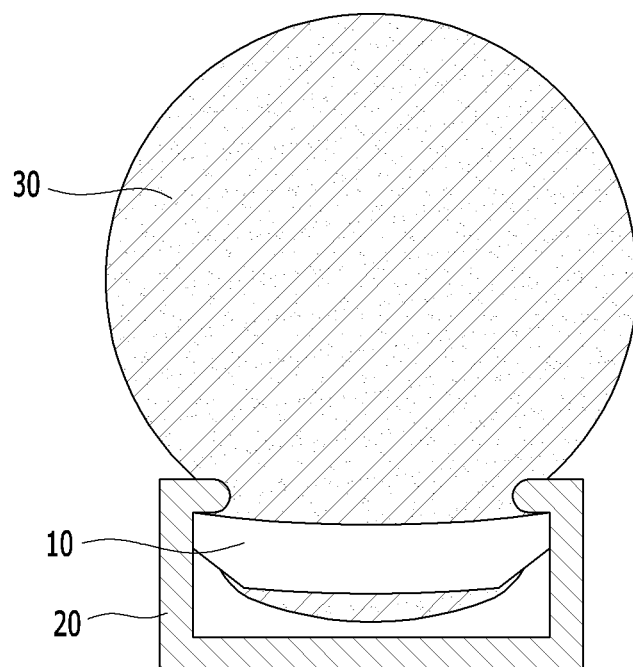
FIG. 20 is a view schematically illustrating a cross-section of a bicycle tire in which a rim and a tire are coupled to each other through the Coupling unit according to the embodiment of the present disclosure.

Meanwhile, FIG. 20 is a view schematically illustrating a cross-section of a bicycle tire in which a rim 20 and a tire 30 are coupled to each other through the Coupling unit 10 according to the embodiment of the present disclosure. It can be understood that description thereof may be the same as or similar to the above description of FIG. 10.

Referring to FIG. 20, the embodiment of the present disclosure may provide a tire for a bicycle, in which the rim 20 and the tire 30 are coupled to each other through the above-described Coupling unit 10 according to the embodiment of the present disclosure.

Here, at least parts of the first side surfaces 13a and 14a of the opposite side members 13 and 14 of the Coupling unit 10, that is, at least a part of the first side surface 13a of the left member 13 of the Coupling unit 10 and/or at least a part of the first side surface 14a of the right member 14 of the Coupling unit 10 may be in surface contact with and be coupled to the inner walls of the flange of the rim 20, and the Coupling unit 10 may have a predetermined fixing force (binding force) against the rim 20, caused by the surface contact.

Further, the Coupling unit 10 according to the embodiment of the present disclosure may include synthetic resin selected from the group consisting of nylon, polyethylene (PE), polypropylene (PP), acetal, acrylonitrile-butadiene-styrene, poly carbonate (PC), polyacetal, PBT, fluororesin, and a combination thereof, and detailed description of each component will be omitted.

Further, the tire 30 coupled to the rim 20 through the Coupling unit 10 according to the embodiment of the present disclosure may include a solid tire manufactured in an injection foaming method, but is not limited thereto.

The Coupling unit 10 according to the embodiment of the present disclosure is easily inserted into the rim 20 when being inserted into the rim 20 and is prevented from being easily separated from the rim 20 in a state in which the Coupling unit is completely inserted into the rim 20. Further, as the Coupling unit 10 is inserted into the rim 20 such that the available space in the rim 20 is secured, a part of the tire 30 surrounds an outer surface of a lower surface of the Coupling unit 10, so that the corresponding bicycle may travel more stably.

Hereinafter, a Coupling unit according to a third aspect of the present disclosure will be described in detail.

The shape of the Coupling unit according to the third aspect of the present disclosure, which will be described below, differs from the shape of the Coupling unit according to the first aspect of the present disclosure only in that a groove is formed on the upper surface, and the other configurations of the Coupling unit according to the third aspect are the same as or similar to the other configurations of the Coupling unit according to the first aspect. Thus, even though there is omitted description, description of the shape of the Coupling unit according to the first aspect may be equally applied to description of the shape of the Coupling unit according to the third aspect.

FIG. 21 is a view illustrating a state in which a Coupling unit according to an embodiment of the present disclosure is separated from a rim. In detail, FIG. 21A is a plan view illustrating the Coupling unit 10 according to the embodiment of the present disclosure, and FIG. 21B is a view illustrating a state in which the Coupling unit 10 according to the embodiment of the present disclosure is separated from the rim 20.

Referring to FIG. 21, the Coupling unit 10 according to the embodiment of the present disclosure may mean a Coupling unit for coupling a tire to a bicycle rim 20, which may be inserted into the rim 20, in other words, a unit used to fasten the tire to the rim 20. The Coupling unit 10 may be otherwise called a fixing pin, a rim fixing unit, or the like, and is not limited thereto.

The Coupling unit 10 according to the embodiment of the present disclosure may include an middle member, a left member 13 extending leftward from the middle member, and a right member 14 extending rightward from the middle member. Here, the left member 13, which is a member formed on the left surface of the Coupling unit 10 with respect to FIG. 21, may be called the left surface 13 when otherwise expressed, and the right member 14, which is a member formed on the right surface of the Coupling unit 10 with respect to FIG. 21, may be called the right surface 14 when otherwise expressed. Further, when the Coupling unit 10 may include the upper surface 11 and the lower surface 12, and the middle member may mean at least a part of a member corresponding to the upper surface 11 and the lower surface 12.

One or more left grooves 11a may be formed on a left portion of a central portion of an upper surface of the middle member, and one or more right grooves 11b may be formed on a right portion of the central portion of the upper surface of the middle member.

In the Coupling unit 10 according to the embodiment of the present disclosure, with respect to the same bending force, amounts by which the left portion and/or the right portion of the Coupling unit 10 are bent and deformed may be larger than an amount by which the central portion of the Coupling unit 10 is bent and deformed, by the left groove 11a and/or the right groove 11b. In other words, in the Coupling unit 10 according to the embodiment of the present disclosure, even when the same force is applied to the upper surface of the Coupling unit 10, the left portion and/or the right portion of the Coupling unit 10 may be further bent than the central portion of the Coupling unit 10 by the left groove 11a and/or the right groove 11b formed on the upper surface of the Coupling unit 10. Through this, the Coupling unit 10 may be easily inserted into the rim 20 without a large force.

Further, the left groove 11a may be formed at the center of the middle member and on a left side of the center of a distal end of the left member 13, and the right groove 11b may be formed at the center of the middle member and on a right side of the center of a distal end of the right member 14. Further, the left groove 11a and the right groove 11b may be symmetric to each other with respect to the center of the upper surface 11 of the Coupling unit 10. Although it is illustrated in FIG. 21A that each of the left groove 11a and the right groove 11b of the Coupling unit 10 according to the embodiment of the present disclosure has two holes each of which a transverse length is longer than a vertical length thereof with respect to the drawing, the present disclosure is not limited thereto. The shape and the number of holes may be variously implemented as illustrated in FIG. 22.

Figure 22:
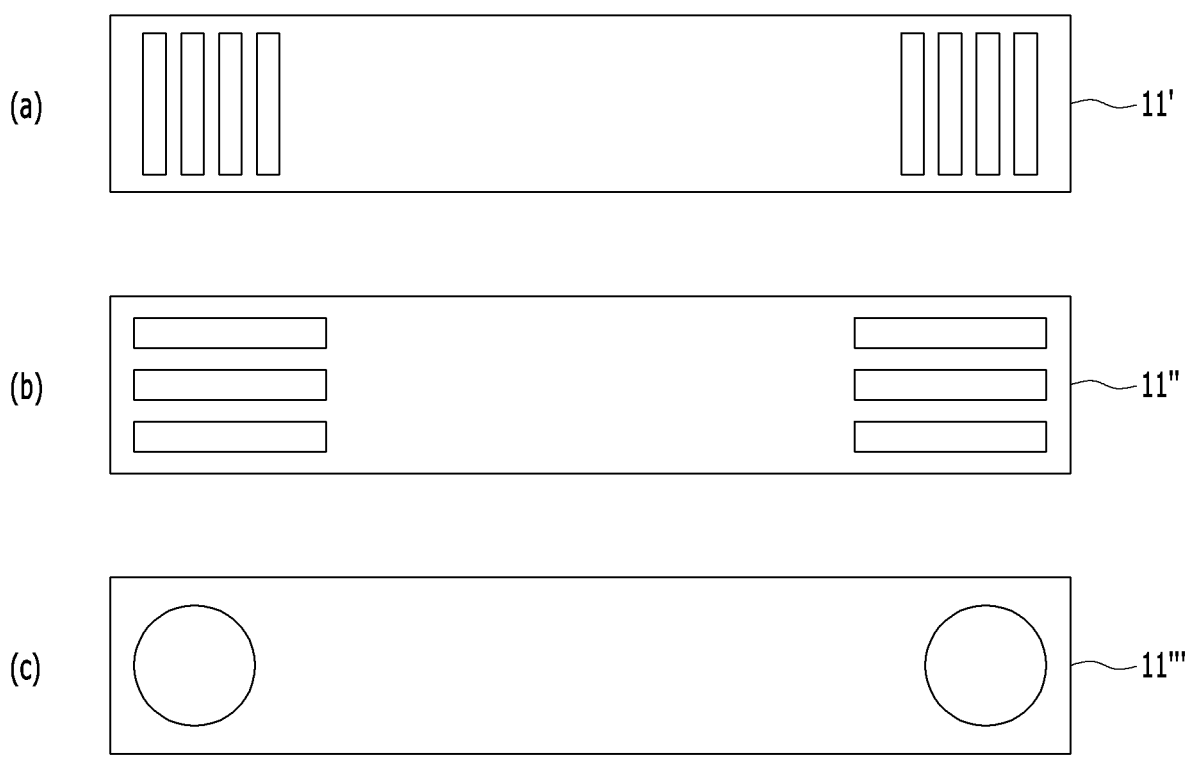
FIG. 22 is a view illustrating a left groove and a right groove formed on an upper surface of the Coupling unit according to another embodiment of the present disclosure.

FIG. 22 is a view illustrating a left groove and a right groove formed on an upper surface of the Coupling unit according to another embodiment of the present disclosure.

Referring to FIG. 22A, each of a left groove and a right groove formed on an upper surface 11' of the Coupling unit according to another embodiment of the present disclosure may include four holes each of which a vertical length is longer than a transverse length thereof with respect to the drawing. Referring to FIG. 22B, each of the left groove and the right groove formed on the upper surface 11" of the Coupling unit according to yet another embodiment of the present disclosure may include three holes each of which a transverse length is longer than a vertical length thereof with respect to the drawing. Referring to FIG. 22C, each of the left groove and the right groove formed on the upper surface 11'" of the Coupling unit according to yet another embodiment of the present disclosure may be formed to have a circular shape. In this way, the number and the shape of the left groove and the right groove formed on the upper surface of the Coupling unit 10 according to the present disclosure may be variously implemented. The Coupling unit 10 will be described below in more detail.

Further, in the Coupling unit 10 according to the embodiment of the present disclosure, the opposite side members 13 and 14 of the Coupling unit 10 may have a predetermined inclination with respect to the upper surface 11 such that the Coupling unit 10 may be easily inserted into the rim 20 when the Coupling unit 10 is inserted into the rim 20. In this case, in the case of the Coupling unit 10 according to the embodiment of the present disclosure, an angle between the left member 13 and the upper surface and an angle between the right member 14 and the upper surface may range from 0 degree to 90 degrees. This may be understood to be the same as or similar to the description previously made with reference to FIG. 2A.

FIG. 2A is a view schematically illustrating a process in which a Coupling unit having no inclination on a side surface thereof (that is, a Coupling unit of which an angle between the opposite side surfaces 13 and 14 and an upper surface is 90°) is inserted into the rim and a process in which a Coupling unit having an inclination on a side surface thereof (that is, a Coupling unit of which an angle between the opposite side surfaces and the upper surface ranges of 0°<x<90°) is inserted into the rim. In detail, (a) of FIG. 2A illustrates the process when the Coupling unit having no inclination on a side surface thereof is inserted into the rim, and (b) of FIG. 2A illustrates the process when the Coupling unit having an inclination on a side surface thereof, such as the Coupling unit 10 according to the embodiment of the present disclosure, is inserted into the rim.

Referring to FIG. 2A, it can be identified that when the Coupling unit having no inclination on a side surface thereof, which is like (a) of FIG. 2A, is inserted into a hook of the rim, the Coupling unit is relatively greatly deformed as compared to the Coupling unit having an inclination on a side surface thereof, which is like (b) of FIG. 2A.

In other words, it can be identified that in order to insert the Coupling unit into the rim, the Coupling unit having no inclination on a side surface thereof should be bent much more than the Coupling unit having an inclination on a side surface thereof. This means that when the Coupling unit is inserted into the rim, a larger force should be applied to the Coupling unit having no inclination on a side surface thereof than to the Coupling unit having an inclination on a side surface thereof, or means that the Coupling unit having no inclination on a side surface thereof should have larger flexibility than that of the Coupling unit having an inclination on a side surface thereof. Thus, when the Coupling unit is inserted into the rim, the Coupling unit having no inclination on a side surface thereof requires a relatively larger force than that of the Coupling unit having an inclination on a side surface thereof, and has difficult manufacturing conditions. When the Coupling unit has considerable flexibility, the Coupling unit may be easily inserted into the rim. However, since the Coupling unit may be easily separated after the insertion, safety is degraded.

Thus, since it is difficult for the Coupling unit, of which an angle between a side surface and an upper surface is 90 degrees or more, to be inserted into the rim, an angle between the opposite side members 13 and 14 on a side surface and an upper surface 11 of the Coupling unit 10 according to the embodiment of the present disclosure ranges of 0°<x<90°, so that the Coupling unit 10 may be easily inserted into the rim without a large force, so that the Coupling unit 10 can be easily inserted into the rim without applying a large force. Further, predetermined flexibility is required, so that it is easy to manufacture the Coupling unit 10. Further, since the Coupling unit 10 according to the embodiment of the present disclosure has predetermined flexibility, the Coupling unit 10 may be easily inserted into the rim and the Coupling unit 10 is not easily separated from the rim in a state in which the Coupling unit is completely inserted into the rim (in other words, an attaching force is reduced after the coupling between the rim and the Coupling unit), so that safety may be further improved.

Meanwhile, in a state in which the Coupling unit 10 is completely inserted into the rim 20, the upper surface 11 of the Coupling unit 10 is in contact with the lower surfaces of the hooks 21a and 21b of the rim 20, so that the Coupling unit 10 may be prevented from being separated from the rim 20. Accordingly, the upper surface 11 of the Coupling unit 10 may be one surface including parts in contact with the lower surfaces of the hooks 21a and 21b in a state in which the rim and the tire are coupled to each other. Further, an additional member for increasing a coupling force between the rim and the tire may be formed on the upper surface 11 of the Coupling unit 10.

Further, a maximum length L of the Coupling unit 10 may be larger than a distance $L_R$ between the two hooks 21a and 21b of the rim 20. Here, the shape of the Coupling unit 10 illustrated in FIG. 21 merely corresponds to one embodiment for helping to understand the present disclosure, and the present disclosure is not limited thereto. For example, the shapes of the opposite side members 13 and 14 of the Coupling unit 10 may be implemented variously as illustrated in FIG. 2B. Accordingly, considering that the shape of the Coupling unit 10 according to the embodiment of the present disclosure may be implemented variously, the maximum length of the Coupling unit according to the present disclosure or the maximum height from a lower surface to an upper surface of the Coupling unit, which will be described below, may be determined based on the shapes.

Referring back to FIG. 21, the opposite side surfaces 13 and 14 may include sliding areas that are slidable with respect to the hooks 21a and 21b of the rim 20 such that the Coupling unit 10 is easily inserted into the rim 20 while the Coupling unit 10 is being inserted into the rim 20. Further, in a state in which the Coupling unit 10 is completely inserted into the rim 20, at least a part of the upper surface 11 of the Coupling unit 10 is in contact with the lower surfaces of the hooks 21a and 21b, so that the Coupling unit 10 may be prevented from being separated from the rim 20.

In this way, in order to easily insert the Coupling unit 10 into the rim 20 through sliding and prevent the Coupling unit 10 inserted into the rim 20 from being easily separated from the rim 20, the Coupling unit 10 according to a third aspect should satisfy the following conditions. Before these conditions are described, the description of the Coupling unit according to the first aspect, which is made with reference to FIGS. 3 to 10, may be equally applied to description of the Coupling unit according to the third aspect, which will be briefly made below.

FIG. 3 is a view for explaining a condition for preventing the Coupling unit according to the embodiment of the present disclosure from being separated from the rim after the Coupling unit 10 is inserted into the rim 20;

Referring to FIG. 3, in order to prevent the Coupling unit 10 from being separated from the rim 20 by an external impact in a state in which the Coupling unit 10 is completely inserted into the rim 20, the maximum length of the Coupling unit 10 may satisfy Equation (1). Further, the description of Equation (1) has been made above in detail, and thus will be omitted.

When the maximum length L of the Coupling unit 10 does not satisfy a condition of Equation (1) (that is, when the maximum length L is smaller than the condition of Equation (1)), the Coupling unit 10 inserted into the rim 20 may be easily separated from the rim 20 by an external force applied to the tire while a bicycle moves. Thus, it is preferable that the maximum length L of the Coupling unit 10 satisfies the condition of Equation (1).

Meanwhile, FIG. 4 is a view for explaining a condition for securing an available space in the rim 20 when the Coupling unit 10 is inserted into the rim 20, and FIG. 4 illustrates a state in which the Coupling unit 10 is completely inserted into the rim 20.

Referring to FIG. 4, in a state in which the Coupling unit 10 is completely inserted into the rim 20, at least a part of the upper surface 11 of the Coupling unit 10 is in contact with the lower surfaces of the two hooks 21a and 21b of the rim 20, so that the Coupling unit 10 may be prevented from being separated from the rim 20 by an external impact. Here, when the Coupling unit 10 is inserted into the rim 20, the maximum height of the Coupling unit 10 may satisfy Equation (2) to secure the available space in the rim 20 after the coupling between the tire and the rim 20. Further, description of Equation (2) has been made above in detail, and thus will be omitted.

According to Equation (2), to secure the available space in the rim 20, the maximum height h from the upper surface 11 to the lower surface 12 of the Coupling unit 10 may be smaller than or equal to the height $H_R$ of the inner wall of the flange.

When there is no available space between a lower surface of the Coupling unit 10 and an inner side of a lower surface of the rim 20 in a state in which the Coupling unit 10 is completely inserted into the rim 20, for example, if the Coupling unit 10 is to be replaced, it is difficult to remove the Coupling unit 10 from the rim 20. Further, when there is no available space in the rim 20 due to the Coupling unit 10 completely inserted into the rim 20, as the tire surrounding an outer side of the lower surface of the Coupling unit 10 may not exist, the tire may not be properly coupled to the rim 20. In this case, even though the Coupling unit 10 is inserted into the rim 20, the tire may be easily separated from the rim 20. Thus, it is preferable that the maximum height h of the Coupling unit 10 satisfies a condition of Equation (2).

FIG. 5 is a view for explaining a condition for inserting the Coupling unit 10 according to the embodiment of the present disclosure into the rim 20 through sliding.

Referring to FIG. 5, in order for the Coupling unit 10 according to the embodiment of the present disclosure to be inserted into the rim 20 through sliding, the minimum length between the opposite side members 13 and 14 may satisfy Equation (3). Further, the description of Equation (3) has been made above in detail, and thus will be omitted.

When the minimum length l between the opposite side members 13 and 14 of the Coupling unit 10 does not satisfy the condition of Equation (3) and is too long, as the Coupling unit 10 is greatly bent as in (a) of FIG. 2A or a large force is required when the Coupling unit 10 is inserted, it is difficult to insert the Coupling unit 10 into the rim 20 or the insertion itself is impossible. Further, when the minimum length l is too long, there is no available space in the rim 20 in a state in which the Coupling unit 10 is completely inserted into the rim 20. Thus, it is preferable that the minimum length l between the opposite side members 13 and 14 of the Coupling unit 10 according to the embodiment of the present disclosure satisfies the condition of Equation (3).

In addition, in order for the Coupling unit 10 according to the embodiment of the present disclosure to be easily inserted into the rim 20, an angle x between the upper surface 11 and the opposite side members 13 and 14 of the Coupling unit 10 may satisfy a range of $0°<x<90°$, as described above.

Meanwhile, FIG. 6 is a view for explaining a length of a sliding area of the Coupling unit according to the embodiment of the present disclosure.

Referring to FIG. 6, as described above, the opposite side members 13 and 14 of the Coupling unit 10 according to the embodiment of the present disclosure may have a straight shape as illustrated in FIG. 22. However, the present disclosure is not limited thereto, and a Coupling unit 10' having a curved shape as illustrated in FIG. 6 may be formed. For example, as illustrated in FIG. 6, in the Coupling unit 10' having a projection on a side surface and an upper surface thereof, a length c of a sliding area of the side surface may mean a length of an elliptic curved line extending from an uppermost portion of the upper surface to a lower surface of the Coupling unit.

Accordingly, in the Coupling unit 10 and 10' according to the embodiment of the present disclosure, the length c of the sliding area may satisfy Equation (4). Since the description of Equation (4) has been described above in detail, the description of Equation (4) will be omitted.

Meanwhile, in a state in which the Coupling unit 10 is completely inserted into the rim 20, at least a part of the sliding area of the Coupling unit 10 may have a predetermined fixing force against the inner wall of the flange, which is caused by friction between the flange inner walls and Coupling unit 10. Here, in a state in which the Coupling unit 10 is inserted into the rim 20 as illustrated in FIG. 4, in order for the Coupling unit 10 to have a fixing force at a corresponding position inside the rim 20, the Coupling unit 10 may satisfy a condition of '$L > L_R + 2P$'. That is, the maximum length L of the Coupling unit 10 is set to be larger than a value obtained by adding a maximum length (that is, 2P) by which each of the two hooks 21a and 21b protrudes from the inner wall of the flange of the rim 20 to the length $L_R$ between the two hooks 21a and 21b of the rim 20, so that the Coupling unit 10 can have a predetermined fixing force inside the rim 20.

In this way, the Coupling unit 10 according to the embodiment of the present disclosure has a shape that satisfies Equation (1) to Equation (3) in addition to Equation (4), so that the Coupling unit 10 may be easily inserted into the rim 20 without a large force when the Coupling unit 10 is inserted into the rim 20. Further, after the Coupling unit 10 is inserted into the rim 20, the Coupling unit 10 may be fixed to the rim 20 so as not to be separated from the rim 20.

Meanwhile, a simulation result performed with respect to the Coupling unit 10 according to the third aspect of the present disclosure may be more easily understood with reference to FIG. 7. In detail, FIG. 7 illustrates a simulation result according to whether the Coupling unit 10 satisfies the conditions of Equation (1) to Equation (3) to determine suitability of the Coupling unit 10. In FIG. 7, a numerical value represents a value in millimeters.

Referring to FIG. 7, it can be identified that when the Coupling unit 10 may not satisfy at least one of the conditions of Equation (1) to Equation (3) as the simulation result for the Coupling unit 10 according to the embodiment of the present disclosure (that is, when any one of Equation (1) to Equation (3) is not satisfied), a comprehensive determination result on suitability as a Coupling unit for coupling the tire to the rim 20 is not satisfied, that is, the corresponding Coupling unit 10 is unsuitable as a tire Coupling unit.

On the other hand, it can be identified that when the Coupling unit 10 according to the embodiment of the present disclosure satisfies all the conditions of Equation (1) to Equation (3), the comprehensive determination result on suitability as a Coupling unit for coupling the tire to the rim 20 is satisfied, that is, the corresponding Coupling unit 10 is suitable as a tire Coupling unit.

Here, when the comprehensive determination result is briefly described, the fact that the Coupling unit 10 does not satisfy the condition of Equation (1) (that is, Equation (1) is not satisfied) may mean that the Coupling unit 10 may be easily separated from the rim 20, and the fact that the Coupling unit 10 does not satisfy the condition of Equation (2) (that is, Equation (2) is not satisfied) may mean that there is no available space in the rim 20 when the Coupling unit 10 is completely inserted into the rim 20. Further, the fact that the Coupling unit 10 does not satisfy the condition of Equation (3) (that is, Equation (3) is not satisfied) may mean that the Coupling unit 10 may not be easily inserted into the rim 20 through sliding.

Thus, the fact that the comprehensive determination result is satisfied means that the Coupling unit 10 according to the embodiment of the present disclosure satisfies all the conditions of Equation (1) to Equation (3). This fact means that the Coupling unit 10 according to the embodiment of the present disclosure may be easily inserted into the rim 20, the available space in the rim 20 may be secured in a state in which the Coupling unit 10 is completely inserted into the rim 20, and the Coupling unit 10 may be prevented from being separated from the rim 20. Thus, it can be understood that the Coupling unit 10 is suitable as a tire Coupling unit.

Meanwhile, FIG. 8 is a view for explaining a physical property of the Coupling unit 10 according to the embodiment of the present disclosure. Referring to FIG. 8, the flexural modulus ($E_{bend}$) of the Coupling unit 10 according to the third aspect of the present disclosure may range from 140 Mpa to 7600 Mpa such that the Coupling unit 10 is prevented from being bent by a load F applied to the Coupling unit 10 after the coupling between the rim 20 and the tire. That is, the Coupling unit 10 according to the embodiment of the present disclosure may satisfy a physical property in which the flexural modulus ($E_{bend}$) ranges from 140 Mpa to 7600 Mpa, so as to be prevented from being bent by the load. This may be more easily understood with reference to FIG. 9.

FIG. 9 is a view illustrating a simulation result for a range of a flexural modulus of the Coupling unit 10 according to the embodiment of the present disclosure.

Referring to FIG. 9, when the flexural modulus of the Coupling unit 10 according to the embodiment of the present disclosure is not more than 140 Mpa as the simulation result for the flexural modulus of the Coupling unit 10, the Coupling unit 10 is very easily bent, and thus is easily separated from the rim 20. Further, when the flexural modulus of the Coupling unit 10 is not less than 7600 Mpa, it is very difficult for the Coupling unit 10 to be bent. Thus, for example, when the Coupling unit 10 needs to be replaced, it is impossible to replace the Coupling unit 10.

Thus, the flexural modulus of the Coupling unit 10 according to the third aspect of the present disclosure may range from 140 Mpa to 7600 Mpa such that the Coupling unit 10 is prevented from being bent very easily or very difficultly.

Here, the flexural modulus of the Coupling unit 10 according to the embodiment of the present disclosure is most preferable under a condition in which a distance Δh between the two hooks of the rim 20 is 20 mm, the maximum length L of the Coupling unit 10 is 21.5 mm, the width w of the Coupling unit 10 is 5 mm, the height h of the Coupling unit 10 is 2.5 mm, and a load F is 20 kgf.

Meanwhile, a cross-section of the bicycle tire in which the rim 20 and the tire 30 are coupled to each other through the Coupling unit according to the third aspect of the present disclosure is illustrated in FIG. 10.

Referring to FIG. 10, the embodiment of the present disclosure may provide a tire for a bicycle, in which the rim 20 and the tire 30 are coupled to each other through the above-described Coupling unit 10 according to the embodiment of the present disclosure.

Here, at least parts of the opposite side members 13 and 14 of the Coupling unit 10 are in surface contact with and are coupled to the inner walls of the flange of the rim 20, so that the Coupling unit 10 may have a predetermined fixing force against the inner walls of the flange, caused by friction between the inner walls of the flange. This makes it possible to effectively reduce noise generated by the Coupling unit 10 when the bicycle travels.

Further, the Coupling unit 10 according to the embodiment of the present disclosure may include synthetic resin selected from the group consisting of nylon, polyethylene (PE), polypropylene (PP), acetal, acrylonitrile-butadiene-styrene, poly carbonate (PC), polyacetal, PBT, fluororesin, and a combination thereof, and detailed description of each component will be omitted.

Further, the tire 30 coupled to the rim 20 through the Coupling unit 10 according to the embodiment of the present disclosure may include a solid tire manufactured in an injection foaming method, but is not limited thereto.

The Coupling unit 10 according to the embodiment of the present disclosure is easily inserted into the rim 20 when being inserted into the rim 20 and is prevented from being easily separated from the rim 20 when the Coupling unit 10 is inserted into the rim 20. Further, as the Coupling unit 10 is inserted into the rim 20 such that the available space in the rim 20 is secured, a part of the tire 30 surrounds an outer surface of a lower surface of the Coupling unit 10, so that the corresponding bicycle may travel more stably.

The above description of the present disclosure is for illustrative purposes, and it can be understood that the present disclosure may be modified into other detailed forms without changing the technical spirit or the essential feature of the present disclosure by those skilled in the art to which the present disclosure pertains. Therefore, it should be understood that the above-described implements/embodiments are not restrictive but illustrative in all aspects. For example, components described in a singular form may be implemented in a distributed state. Likewise, components described in a distributed state may be implemented in a coupled form.

The scope of the present disclosure is defined not by the detailed description but by the appended claims, and it should be interpreted that the meaning and the range of the appended claims, and all changes or changed forms derived from an equivalent thereof are included in the scope of the present disclosure.

I claim:

1. A coupling unit for coupling a tire to a rim, the coupling unit comprising:
a left member;
a right member; and
a middle member between the left member and the right member,
wherein one or more left grooves are formed in a left portion of a central portion of an upper surface of the middle member and/or one or more right grooves are formed in a right portion of the central portion of the upper surface of the middle member;
wherein the coupling unit comprise: a maximum length L satisfying the following equation 1, $$L \geq \sqrt{\left(L_R + P - \frac{1}{2}h\right)^2 + (H_R + R)^2} \quad \text{[equation 1]}$$

where $L_R$ denotes a length between hooks of the rim, P denotes a maximum length by which the hooks protrude from inner walls of a flange of the rim, R denotes ½ of a thickness of the hooks, h denotes a maximum height from an upper surface to a lower surface of the coupling unit, and $H_R$ denotes a height of the inner walls of the flange;
wherein the maximum height h satisfies the following equation 2, $$h \leq H_R; \quad \text{[equation 2]}$$

wherein the coupling unit comprises: a minimum length l between the left member and the right member, the minimum length l satisfying the following equation 3, $$l \leq \sqrt{(L_R + P - b)^2 + (H_R + R)^2} \quad \text{[equation 3]}$$

where b denotes a larger one of h and (L−l)/2.

2. The coupling unit of claim 1,
wherein, with respect to a same bending force, amounts by which the left portion and/or the right portion are bent and deformed are larger than an amount by which the central portion is bent and deformed.

3. The coupling unit of claim 1,
wherein the one or more left grooves are formed on a left side with respect to a center portion between a center of the central member and an end of the left member, and the one or more right grooves are formed on a right side with respect to the center portion between the center of the central member and an end of the right member.

4. The coupling unit of claim 1,
wherein the left grooves and the right grooves are symmetric to each other with respect to the central portion.

5. The coupling unit of claim 1,
wherein a flexural modulus of the coupling unit ranges from 140 Mpa to 7600 Mpa.

6. The coupling unit of claim 1,
wherein the maximum length is larger than a distance between the hooks of the rim, and
wherein in a state in which the coupling unit is completely inserted into the rim, at least a part of the upper surface of the coupling unit is in contact with lower surfaces of the hooks to prevent the coupling unit from being separated from the rim.

7. The coupling unit of claim 1,
wherein the left member and/or the right member include sliding areas that are slidable with respect to the hooks of the rim while the coupling unit is being inserted into the rim,
wherein the sliding areas have a length c satisfying the following equation 4;

$$c < 110\% \times \frac{\pi}{2} \sqrt{\frac{(\Delta a)^2 + (\Delta b)^2}{2}} \quad \text{[equation 4]}$$

where Δa denotes a length transversely extending from a distal end of the lower surface to an intersecting point between a transverse extending virtual line of an uppermost portion of the upper surface and a vertical extending virtual line of one distal end of a longest portion of the coupling unit, and Δb denotes a length vertically extending from a distal end of the lower surface to an intersecting point between a transverse extending virtual line of an uppermost portion of the upper surface and a vertical extending virtual line of one distal end of a longest portion of the coupling unit.

8. The coupling unit of claim 1,
wherein the left member and/or the right member include sliding areas that are slidable with respect to the hooks of the rim while the coupling unit is being inserted into the rim, and
wherein in a state in which the coupling unit is completely inserted into the rim, at least parts of the sliding areas of the coupling unit are in surface contact with and are coupled to the inner walls of the flange, and thus have a predetermined fixing force against the inner walls of the flange, which is caused by friction between the inner walls and the coupling unit.

9. The coupling unit of claim 1,
wherein the tire includes a solid tire manufactured in an injection foaming method.

10. The coupling unit of claim 1,
wherein an angle x between the left member and/or the right member and the upper surface satisfies ranges of $0°<x<90°$.

11. The coupling unit of claim 1,
wherein the coupling unit includes synthetic resin selected from the group consisting of nylon, polyethylene, polypropylene, acetal, acrylonitrile-butadiene-styrene, poly carbonate, polyacetal, PBT, fluororesin, and a combination thereof.

12. The coupling unit of claim 1,
wherein the tire includes: a bicycle tire.

13. A coupling unit for coupling a tire to a rim, the coupling unit comprising:
a left member;
a right member; and
a middle member between the left member and the right member,
wherein one or more left grooves are formed in a left portion of a central portion of an upper surface of the middle member and/or one or more right grooves are formed in a right portion of the central portion of the upper surface of the middle member;
wherein the left member and/or the right member include sliding areas that are slidable with respect to hooks of the rim while the coupling unit is being inserted into the rim; and
wherein the sliding areas have a length c satisfying the following equation 1;

$$c < 110\% \times \frac{\pi}{2} \sqrt{\frac{(\Delta a)^2 + (\Delta b)^2}{2}} \qquad \text{[equation 1]}$$

where $\Delta a$ denotes a length transversely extending from a distal end of the lower surface to an intersecting point between a transverse extending virtual line of an uppermost portion of the upper surface and a vertical extending virtual line of one distal end of a longest portion of the coupling unit, and $\Delta b$ denotes a length vertically extending from a distal end of the lower surface to an intersecting point between a transverse extending virtual line of an uppermost portion of the upper surface and a vertical extending virtual line of one distal end of a longest portion of the coupling unit.

\* \* \* \* \*